US008539382B2

(12) United States Patent
Lyon et al.

(10) Patent No.: US 8,539,382 B2
(45) Date of Patent: Sep. 17, 2013

(54) PREVENTING UNINTENTIONAL ACTIVATION AND/OR INPUT IN AN ELECTRONIC DEVICE

(75) Inventors: Jeremy Godfrey Lyon, Sunnyvale, CA (US); Matias Gonzalo Duarte, Sunnyvale, CA (US); Daniel Marc Gatan Shiplacoff, Los Angeles, CA (US); Richard R. Dellinger, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 634 days.

(21) Appl. No.: 12/417,871

(22) Filed: Apr. 3, 2009

(65) Prior Publication Data
US 2010/0257490 A1 Oct. 7, 2010

(51) Int. Cl.
| | | |
|---|---|---|
| G06F 3/033 | (2013.01) | |
| G06F 3/00 | (2006.01) | |
| G06F 3/048 | (2013.01) | |
| G06F 21/00 | (2013.01) | |
| H04M 1/66 | (2006.01) | |

(52) U.S. Cl.
USPC ........... 715/863; 715/741; 715/769; 713/182; 455/411

(58) Field of Classification Search
USPC .......................................... 715/769, 863, 846
See application file for complete search history.

(56) References Cited

U.S. PATENT DOCUMENTS

| | | | | |
|---|---|---|---|---|
| 7,657,849 | B2 * | 2/2010 | Chaudhri et al. | 715/863 |
| 2004/0001094 | A1 * | 1/2004 | Unnewehr et al. | 345/769 |
| 2005/0253817 | A1 * | 11/2005 | Rytivaara et al. | 345/173 |
| 2007/0150842 | A1 * | 6/2007 | Chaudhri et al. | 715/863 |
| 2008/0220752 | A1 * | 9/2008 | Forstall et al. | 455/415 |
| 2009/0006991 | A1 * | 1/2009 | Lindberg et al. | 715/763 |
| 2009/0237421 | A1 * | 9/2009 | Kim et al. | 345/661 |
| 2009/0249240 | A1 * | 10/2009 | Lundy et al. | 715/771 |
| 2009/0264159 | A1 * | 10/2009 | Hsieh et al. | 455/566 |
| 2009/0265666 | A1 * | 10/2009 | Hsieh et al. | 715/835 |
| 2009/0288032 | A1 * | 11/2009 | Chang et al. | 715/776 |
| 2009/0327976 | A1 * | 12/2009 | Williamson et al. | 715/863 |
| 2010/0099394 | A1 * | 4/2010 | Hainzl | 455/418 |
| 2010/0146384 | A1 * | 6/2010 | Peev et al. | 715/255 |
| 2010/0159995 | A1 * | 6/2010 | Stallings et al. | 455/566 |
| 2010/0162169 | A1 * | 6/2010 | Skarp | 715/833 |
| 2010/0248688 | A1 * | 9/2010 | Teng et al. | 455/411 |
| 2010/0248689 | A1 * | 9/2010 | Teng et al. | 455/411 |

* cited by examiner

*Primary Examiner* — Nicholas Ulrich

(57) ABSTRACT

A system and method for preventing unintentional activation and/or input in an electronic device are provided. A movable on-screen user interface object is provided as an unlocking mechanism in a device having a touch-sensitive surface. The user moves the object in any desired direction from a starting point (or origin); if the object is moved a sufficient distance away from the starting point, the device is unlocked. The required amount of movement may be defined by a threshold which may or may not be made visible to the user. In various embodiments, the threshold may be defined by an arc, a circle, or by a straight line, or in some other arbitrary manner. In various embodiments, user authentication can be required before unlocking takes effect. In various embodiments, certain alerts can be displayed while the device is locked.

28 Claims, 15 Drawing Sheets

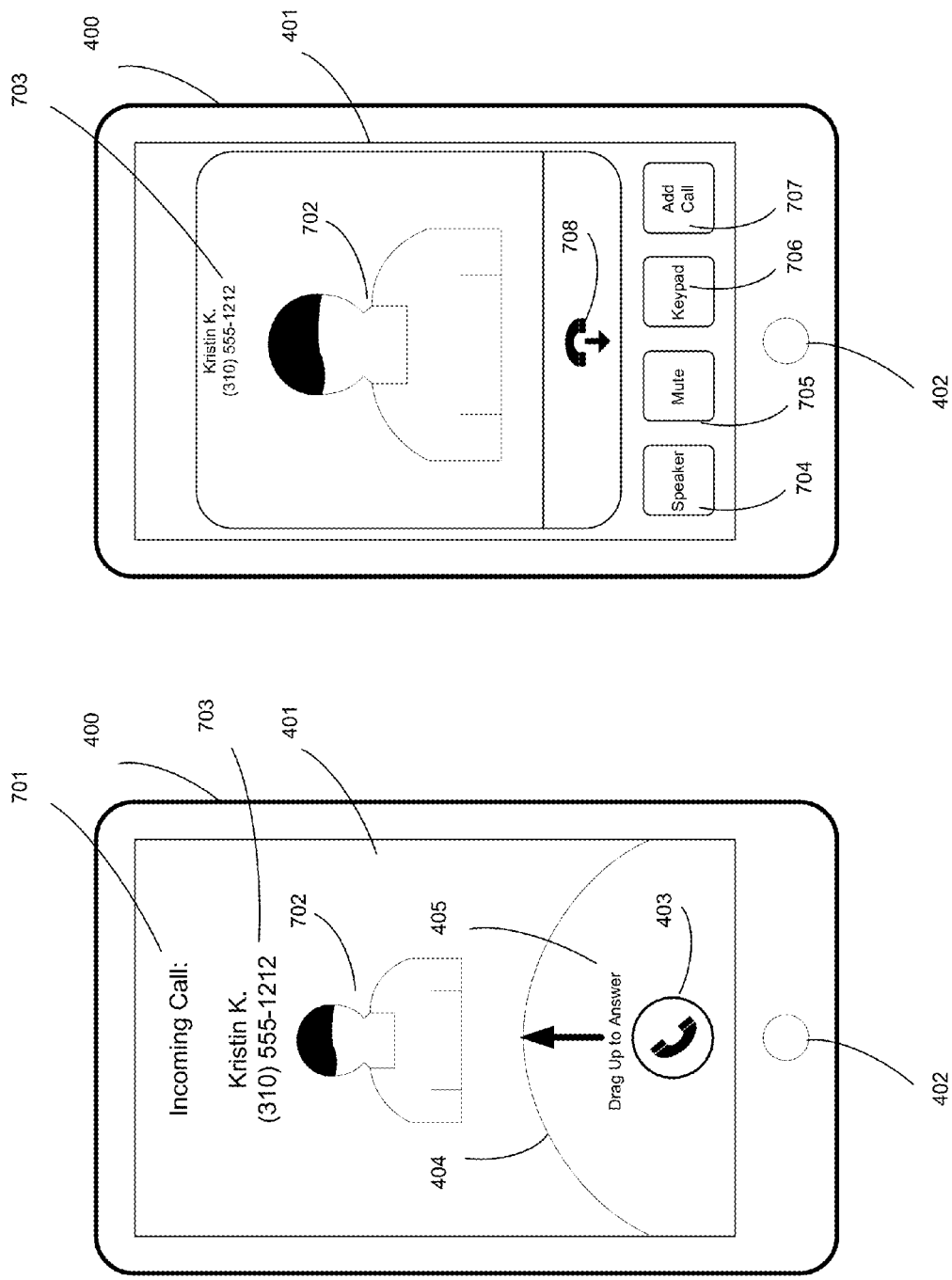

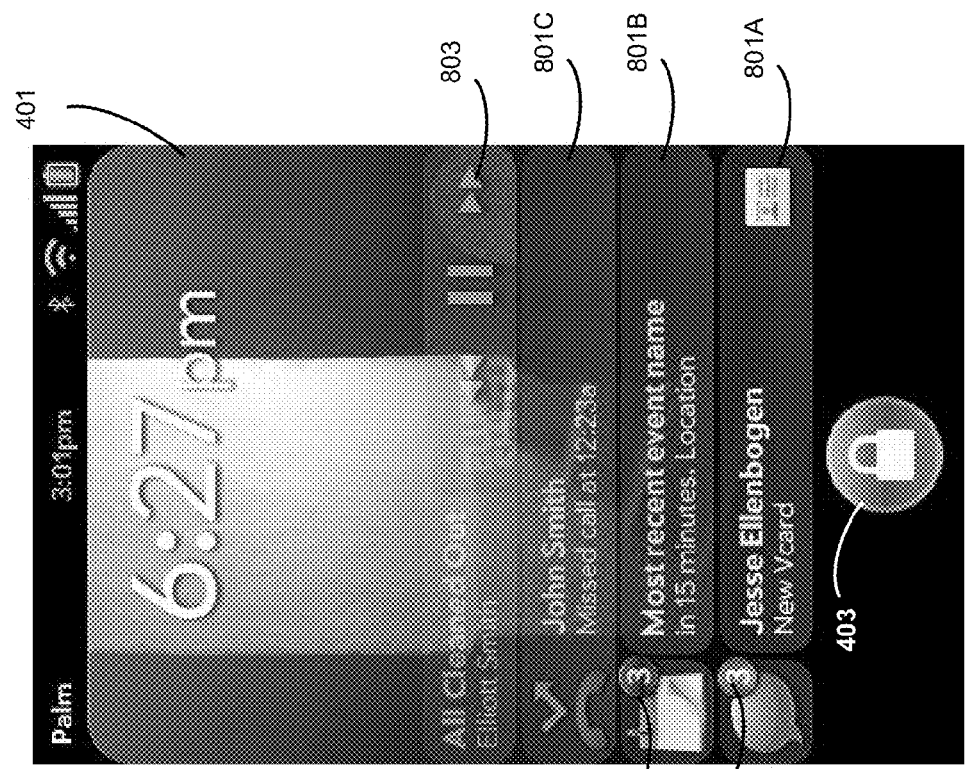
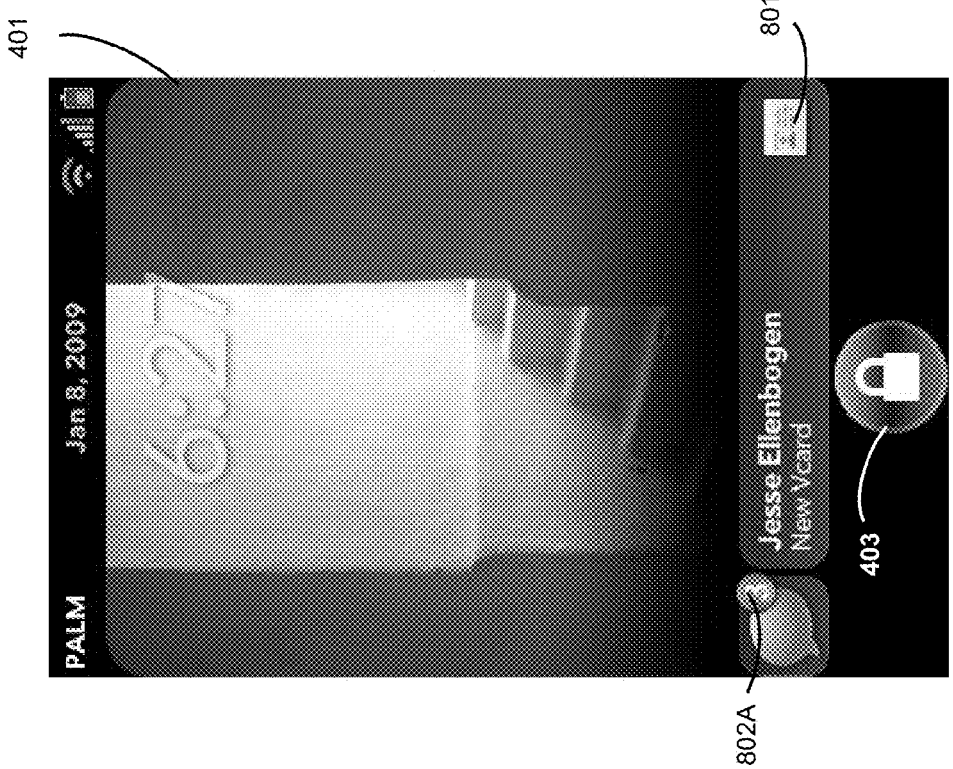
FIG. 8B
FIG. 8A

PREVENTING UNINTENTIONAL ACTIVATION AND/OR INPUT IN AN ELECTRONIC DEVICE

CROSS-REFERENCE TO RELATED APPLICATIONS

The present application is related to U.S. patent application Ser. No. 12/200,782, filed Aug. 28, 2008, for "Notifying a User of Events in a Computing Device", the disclosure of which is incorporated herein by reference.

FIELD OF THE INVENTION

In various embodiments, the present invention relates to a user interface for a computing device having a touch-sensitive surface, and more particularly to systems and methods for locking and unlocking such a computing device so as to prevent unintentional activation and/or input.

DESCRIPTION OF THE RELATED ART

Cell phones, smartphones, personal digital assistants, and other mobile devices are often susceptible to accidental activation while being carried. Users often carry such devices in a pocket, purse, bag, or briefcase, or they may attach such devices to a belt or strap. In such situations, there are many opportunities for the device to come in contact with another item, or with the user's hand, or with an inside surface of the pocket, purse, or bag. The device may mistakenly interpret such contact as user input, causing the device to initiate a dialing operation or other operation without the user's knowledge.

For example, on many cell phones, a number can be dialed by pressing or holding down a button, or by touching a touch-sensitive surface such as a touchscreen. If, in the course of being carried in a pocket or purse, a button is inadvertently pressed or held down for some period of time, or a touchscreen is touched a certain way, the cell phone may initiate a voice call without the user's knowledge. In many cases, such inadvertent calls can consume valuable cell phone minutes, and thereby cost the user money. In addition, the user may not be reachable by telephone while the inadvertent call is in progress. Finally, the cell phone's microphone can pick up ambient conversations and other audio while the inadvertent call is in progress, and can relay such audio to the recipient of the call; this can result in potential embarrassment, or worse, the unwanted divulgence of confidential or sensitive information.

Similar problems exist with more sophisticated devices that can send email messages and performing other computing operations. Accidental activation of commands and functions on such devices can lead to inadvertent initiation of communications, or even to loss of valuable data (for example by inadvertently deleting an email message or document).

Many mobile devices include a locking feature to prevent such inadvertent operations. For example, a user can manually lock a device so that it does not respond to user input unless some particular unlock operation is first performed. Some devices automatically lock themselves after some period of inactivity, or upon conclusion of a voice call or other activity.

To unlock a mobile device, a user may enter a particular combination of two or more buttons that is highly unlikely to be accidentally entered while the device is in a pocket or purse.

Alternatively, for devices having a touch-sensitive surface, a user interface object referred to as a virtual slider can be used. Referring now to FIGS. 1A and 1B, there is shown an example of such a virtual slider as shown on a touchscreen 101 of a device 100, according to techniques that are known in the art. A virtual sliding control 104 includes a user interface object 103 (also referred to as a "slider") that can be moved by the user along an axis defined by a bar 102. In order to unlock device 100, the user must drag his or her finger across the touchscreen, starting at a particular location and proceeding in a particular direction, so as to move slider 103 along bar 102. As the user drags his or her finger, slider 103 moves along bar 104. Once the user's finger reaches the end of bar 102, having dragged slider 103 along, device 100 is unlocked.

One example of a device using a virtual slider for unlocking is the iPhone from Apple Inc. of Cupertino, Calif., in which a horizontal virtual slider can be manipulated via a touchscreen.

A disadvantage of a virtual slider is the relative inflexibility of its operation. A user may find it difficult to unlock the phone due to the requirement that the slider be moved in a particular direction and along a particular axis. In addition, since the slider generally operates in a single direction, a handedness problem arises: a slider designed for a right-handed person may be more difficult for a left-handed person to use.

In addition, it is also useful, in some cases, for a user to be able to check for messages, reminder, and other alerts without necessarily unlocking the device. Existing mobile devices do not generally provide any flexible, easy-to-use method for a user to check for such events without unlocking the device. Accordingly, users are often given limited or no information as to such events prior to unlocking the device, and are forced to unlock the device in order to check for such events. This requirement to unlock the device can be cumbersome to some users, especially if the user checks the device frequently for events. In addition, the requirement to repeatedly unlock the device can lead to unwanted dialing or operation of the device, if the user forgets to re-lock the device or if there is a time-out period before automatic locking takes place.

What is needed is a system and method for unlocking a device having a touch-sensitive surface such as a touchscreen, in a flexible manner that avoids excessive burden on the user. What is further needed is a flexible mechanism for informing a user as to events without requiring the user to unlock the device.

SUMMARY

According to various embodiments of the present invention, an improved system and method for preventing unintentional activation and/or input in an electronic device are provided. A movable on-screen user interface object is provided as an unlocking mechanism in a device having a touch-sensitive surface. In various embodiments, the user drags the movable object in any desired direction from a starting point (or origin); if the object is moved a sufficient distance away from the starting point, the device is unlocked. The required amount of movement may be defined as a minimum distance or by a threshold boundary which may or may not be made visible to the user. For example, in one embodiment, the required amount of movement may be defined by an arc drawn along a circle substantially centered on the movable object's origin, or by a circle substantially centered on the movable object's origin, or by a straight line, or in some other arbitrary manner.

In some embodiments, movement of the object may be permitted in any direction including a full 360-degree range about the origin. In other embodiments, movement of the object may be constrained due to the position of the origin with respect to an edge of the touch-sensitive surface; alternatively, any arbitrary restriction may be placed on the permissible direction of the object's movement.

In various embodiments, visual, auditory, and/or tactile feedback may be provided to inform the user as to whether or not the slider is being moved in a correct direction to unlock the device. In various embodiments, additional feedback may be provided to indicate that the slider has been moved sufficiently to unlock the device. In various embodiments, additional feedback may be provided when the user releases the slider after reaching the minimum distance or threshold boundary, thus successfully unlocking the device. In various embodiments, additional feedback may be provided to indicate failure to unlock the device, such as if the user releases the slider prior to reaching the minimum distance or threshold boundary; for example, the slider may return to its origin.

In various embodiments, the slider can be controlled by direct manipulation on a touchscreen. In other embodiments, the user can control movement of the slider via buttons, stylus, touchpad, joystick, rocker, five-way switch, keyboard, or any other mechanism.

According to various embodiments of the present invention, a security function can be enabled in which a user is authenticated before being granted access to the various functions of the device. This authentication mechanism can be integrated with the virtual slider described herein, so that a password, PIN, or other input is required, either before or after the device is unlocked via the slider.

According to various embodiments of the present invention, certain alerts, or event notifications, can be presented to a user prior to unlocking. The user can be notified as to email messages, text messages, instant messages, voicemail messages, status events, alerts, alarms, or the like. In some embodiments, certain types of alerts may be suppressed for security reasons, so as to avoid displaying sensitive information on the screen prior to user authentication. In some embodiments, the user can specify what types of alerts may or may not be presented while the device is locked. Furthermore, in some embodiments, alerts may be presented in different formats, depending on various factors; for example, older alerts may be presented in a summary or compact format.

Additional features and advantages will become apparent in the description provided below.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 7A depicts an example of operation of a movable user interface object for answering an incoming voice call, according to one embodiment.

FIG. 7B depicts an example of a user interface for use during a voice call, according to one embodiment.

FIGS. 8A through 8F depict examples of a display of alerts while a device is locked, according to one embodiment.

DETAILED DESCRIPTION OF THE EMBODIMENTS

System Architecture

Figure 1B:
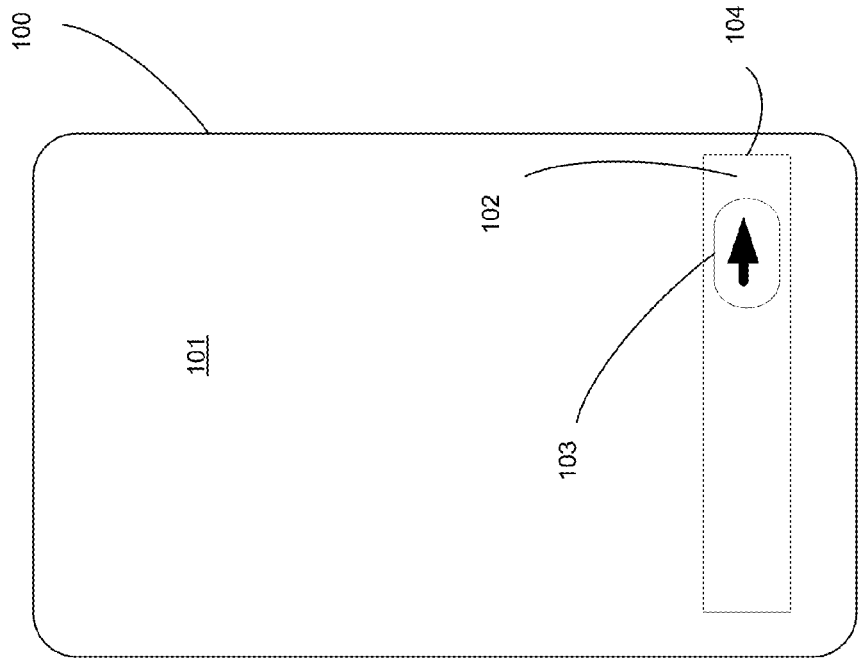
FIGS. 1A and 1B depict a touchscreen display including a single-axis virtual slider according to the prior art.
Figure 1A:
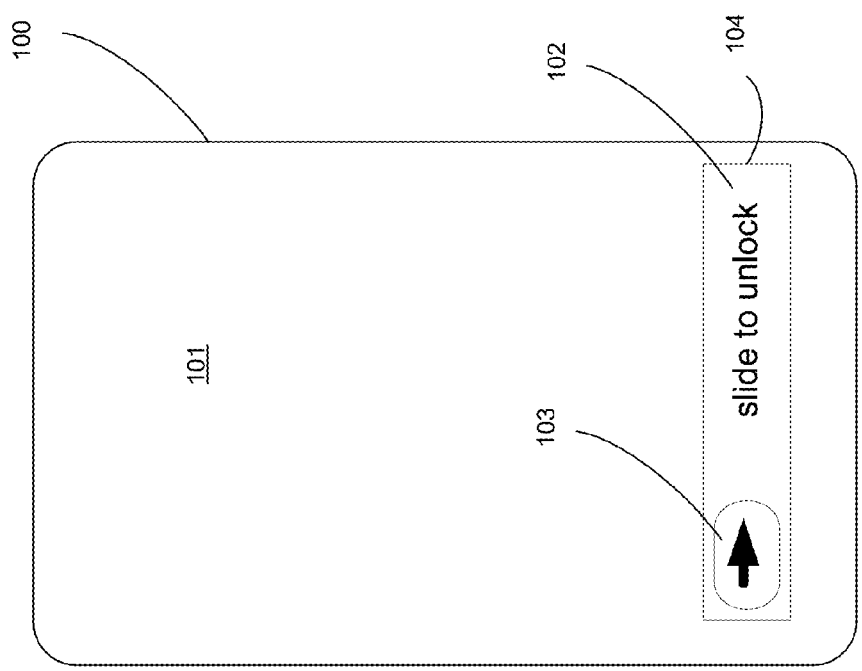

According to various embodiments, the present invention can be implemented on any electronic device, such as a handheld computer, personal digital assistant (PDA), personal computer, kiosk, cellular telephone, and the like. For example, in various embodiments, the invention can be implemented as a feature of a software application or operating system running on such a device. Accordingly, in various embodiments, the present invention can be implemented as part of a graphical user interface for controlling and interacting with software on such a device.

In various embodiments, the invention is particularly well-suited to devices such as smartphones, handheld computers, media players, and PDAs, which are often used as mobile devices and which may be carried in a pocket or purse, or on a belt. Such devices commonly have telephone, email, and/or text messaging capability, and may perform other functions including, for example, playing music and/or video, surfing the web, running productivity applications, and the like. Such devices are often susceptible to being accidentally activated by incidental and unintentional contact with other objects in the pocket or purse, or by the user's hand, or by other objects. One skilled in the art will recognize, however, that in other embodiments the invention can be practiced in other contexts, including any environment in which it is useful to lock and unlock an electronic device. Accordingly, the following description is intended to illustrate various embodiments of the invention by way of example, rather than to limit the scope of the claimed invention.

In one embodiment, the present invention is implemented on a device having a touch-sensitive screen that allows for direct manipulation of objects displayed on-screen. In various embodiments, the touch-sensitive screen can be implemented using any technology that is capable of detecting a location of contact. In other embodiments, the present invention can be implemented using a touch-sensitive surface, such as a touchpad, separate from the screen; such touchpads (also known as trackpads) are well known for manipulating on-screen objects in devices such as laptop computers. In another embodiment, a user can interact with on-screen items by way of a keyboard and/or pointing device such as a trackball, roller switch, stylus, touchpad, mouse, or the like. In one embodiment, the device on which the screen is presented also includes a touch-sensitive gesture area (not shown) for entering gesture-based commands.

One skilled in the art will recognize that many types of touch-sensitive screens and touch-sensitive surfaces exist and are well-known in the art, including for example:

- capacitive screens/surfaces, which detect changes in a capacitance field resulting from user contact;
- resistive screens/surfaces, where electrically conductive layers are brought into contact as a result of user contact with the screen or surface;
- surface acoustic wave screens/surfaces, which detect changes in ultrasonic waves resulting from user contact with the screen or surface;
- infrared screens/surfaces, which detect interruption of a modulated light beam or which detect thermal induced changes in surface resistance;
- strain gauge screens/surfaces, in which the screen or surface is spring-mounted, and strain gauges are used to measure deflection occurring as a result of contact;
- optical imaging screens/surfaces, which use image sensors to locate contact;
- dispersive signal screens/surfaces, which detect mechanical energy in the screen or surface that occurs as a result of contact;
- acoustic pulse recognition screens/surfaces, which turn the mechanical energy of a touch into an electronic signal that is converted to an audio file for analysis to determine position of the contact; and
- frustrated total internal reflection screens, which detect interruptions in the total internal reflection light path.

Any of the above techniques, or any other known touch detection technique, can be used in connection with the device of the present invention, to detect user contact with the screen or with some other touch-sensitive surface that is used to control objects on the screen.

For illustrative purposes, and for greater clarity, the invention will be described herein in terms of a touchscreen, referring to a touch-sensitive screen that permits the user to directly manipulated displayed objects. One skilled in the art will recognize, however, that the description provided herein is merely exemplary, and that the invention can be implemented in other embodiments wherein other mechanisms are used for moving and manipulating on-screen objects.

In addition to or in place of the touchscreen, the device may also have other input and/or output devices. For example, in one embodiment device may include a keyboard (not shown), rocker switch (not shown), five-way switch (not shown), trackball (not shown), or the like. Any number of buttons and/or additional input devices can be provided, without affecting the operation of the invention as claimed herein.

Movable User Interface Object

Referring now to FIGS. 4A through 4I, there are shown various examples of the operation of a movable user interface object for unlocking a device 400 having a touch-sensitive screen 401 or other mechanism for manipulating an onscreen object, according to one embodiment. In various examples depicted herein, device 400 includes button 402, which may be used for various functions but is not essential to the operation of the present invention.

Figure 4C:
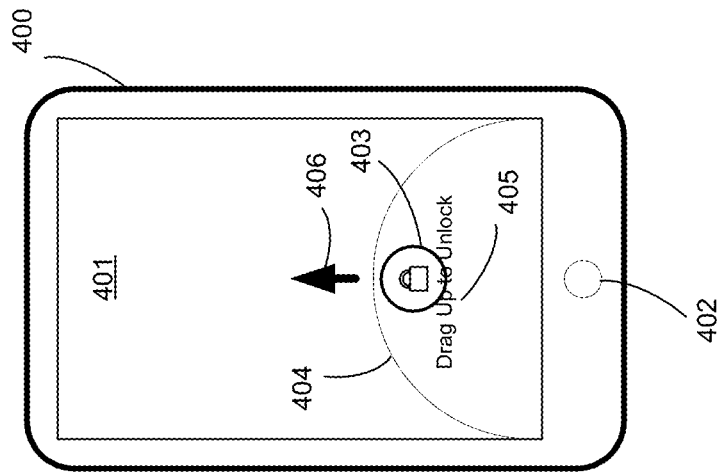
FIGS. 4A through 4C depict an example of operation of a movable user interface object for unlocking a device according to one embodiment, wherein a threshold boundary is defined as an arc.
Figure 4B:
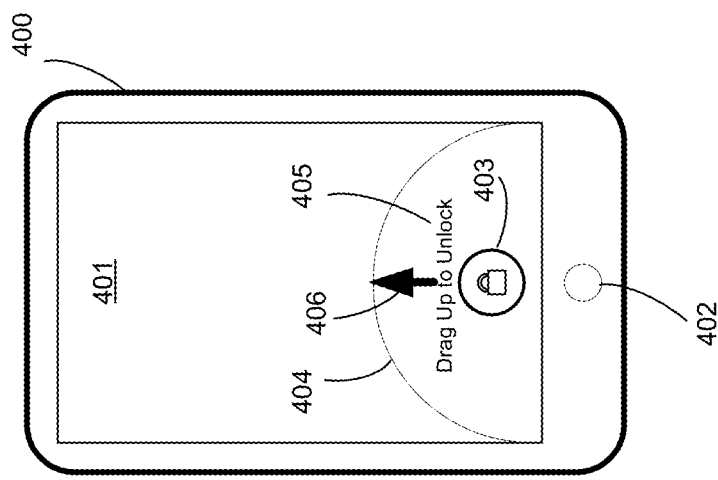
Figure 4A:
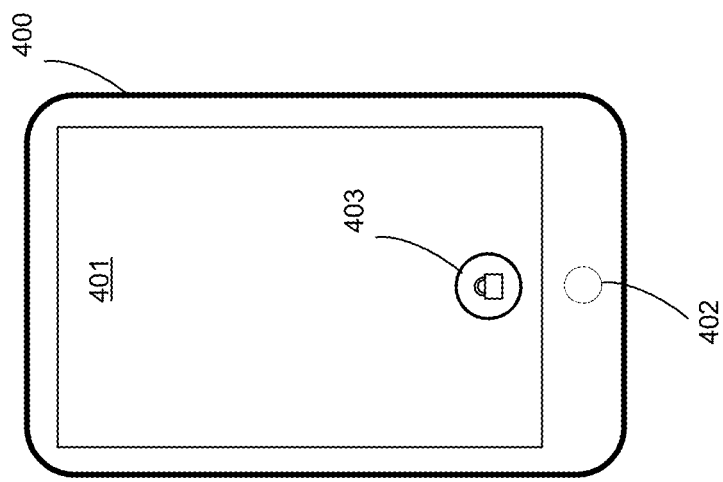

FIG. 4A depicts device 400 in a locked state, according to one embodiment. In one embodiment, device 400 enters the locked state when a user presses a lock button, or otherwise manually locks device 400. In one embodiment, device 400 enters the locked state when device 400 is first powered up, or when a voice call ends, or when some task or activity is completed or ended. In another embodiment, device 400 enters the locked state automatically after some period of inactivity, such as after 30 seconds. In another embodiment, device 400 remains unlocked when connected to a charger or dock, but enters the locked state when disconnected from a charger or dock.

In another embodiment, device 400 enters a sleep state (automatically turning off or dimming screen 401) after some period of inactivity, such as after 30 seconds. In another embodiment, device 400 enters the locked state or sleep state in response to being placed face down on a surface. Upon being awoken from sleep state (for example by user contact with screen 401 or with button 402), device 400 enters locked state.

When in the locked state, many features of device 400 may be unavailable for use. For example, in one embodiment, the user cannot initiate or receive a voice call, or launch an application, or send or receive email messages, or perform other functions while device 400 is locked. In another embodiment, when device 400 is locked, no functionality is available except an interface for unlocking device 400. In yet another embodiment, when device 400 is locked, some status indicators and other information may be visible in locked state, such as a battery life indicator, a signal strength indicator, a clock, and the like. In some embodiments, screen 401 may automatically shut off when device 400 is locked, so as to conserve battery power; in some embodiments, screen 401 may be reactivated when touched, or when the user presses a button on device 400. In some embodiments, device 400 may be equipped with an accelerometer, light sensor(s), proximity sensor(s), and/or other detectors of environmental conditions, so that screen 401 may be automatically activated or deactivated in response to such conditions.

In one embodiment, an indicator is displayed to inform the user that device 400 is locked. For example, in FIG. 4A, a padlock icon is shown as part of movable user interface object 403. In the example, movable object 403 is shown at an initial location referred to herein as its "origin". In various embodiments, movable object 403 can take any form and can include an icon, text, image, or any combination thereof, and can be of any desired shape or size.

One skilled in the art will recognize that any type of indicator can be used, including one or more icons, text, status indicators (such as LED indicators), or the like. In some embodiments, audio and/or tactile indicators can also be used to inform the user that device 400 is locked; for example, device 400 may emit a distinctive beep or other sound when the user attempts to interact with device 400 while it is locked.

In one embodiment, movable object 403 responds to the user's touch, so that the user can drag object 403 in any desired direction on screen 401. Such functionality can be implemented, for example, using known techniques for touchscreen operation. Alternatively, object 403 may move in response to the user's input via other input means, such as a touchpad, trackball, or the like.

In one embodiment, device 400 is unlocked when object 403 moves a sufficient distance away from its origin. In one embodiment, the particular direction of movement is irrelevant. In another embodiment, the direction of movement of object 403 is constrained, for example by the edge of screen 401; thus, device 400 is unlocked when object 403 moves a sufficient distance away from its origin in a direction that falls within a defined range of directions.

In yet another embodiment, device 400 is unlocked when object 403 moves far enough from its origin to touch or cross a threshold boundary. The threshold boundary may or not be explicitly shown on device 400. In one embodiment, the threshold boundary is shown on-screen in response to user contact with screen 401 or in response to detection of user input moving object 403, and the threshold boundary is not shown on-screen when the user releases object 403 by ending contact with screen 401.

In various embodiments, the threshold boundary may be defined as a circle surrounding the origin, or an arc defining a portion of a circle surrounding the origin, or a straight line. Alternatively, the threshold boundary may be defined by any other arbitrary means.

Referring now to FIGS. 4B and 4C, there is shown an example of an unlocking mechanism according to one embodiment of the present invention, wherein a threshold boundary 404 is defined as an arc partially surrounding the origin point of movable object 403. FIG. 4B depicts an example of screen 401 when the user initiates contact or movement of object 403; FIG. 4C depicts an example of screen 401 after the user has begun to drag object 403 upward toward threshold boundary 404.

As depicted in FIGS. 4B and 4C, in one embodiment threshold boundary 404 becomes visible when the user starts to drag object 403; if the user releases object 403 before completing the unlock operation, threshold boundary 404 disappears from screen 401 and object 403 returns to its origin. Alternatively, threshold boundary 404 may be visible at all times. Alternatively, threshold boundary 404 may not be visible at all.

Also, as depicted in FIGS. 4B and 4C, in one embodiment, screen 401 may show text message 405 and/or arrow 406 to reinforce, for the user, the input mechanism that the user should perform in order to unlock device 400.

In one embodiment, as the user drags object 403 upward toward threshold boundary 404, arrow 406 and/or text message 405 may move as well; alternatively, arrow 406 and/or text message 405 may remain in its original position.

In one embodiment, a visual characteristic of movable object 403 may change as object 403 is dragged toward threshold boundary 404; for example, its color, size, shape, or other characteristic may change, so as to reinforce to the user that object 403 is being moved closer to threshold boundary 404. In one embodiment, threshold boundary 404 may become more prominent or otherwise change in visual appearance as object 403 moves closer to it. In another embodiment, tactile and/or auditory feedback can be used to inform the user that object 403 is being moved closer to threshold boundary 404.

In one embodiment, once object 403 crosses threshold boundary 404, or otherwise moves a sufficient distance from the origin, device 400 is unlocked and the user is given access to various features and/or functions of device 400. In one embodiment, distinctive visual, auditory, and/or tactile feedback is provided to inform the user that device 400 has been unlocked. In one embodiment, device 400 is unlocked in response to any part of object 403 touching threshold boundary 404; in another embodiment, device 400 is unlocked when object 403 fully crosses threshold boundary 404; in yet another embodiment, device 400 is unlocked when object 403 substantially crosses threshold boundary 404.

In one embodiment, if the user releases movable object 403 before crossing threshold boundary 404, or before moving object 403 a sufficient distance from the origin, device 400 remains in its locked state. In one embodiment, object 403 returns to its origin. In one embodiment, distinctive visual, auditory, and/or tactile feedback is provided to inform the user that device 400 is still locked.

Figure 4F:
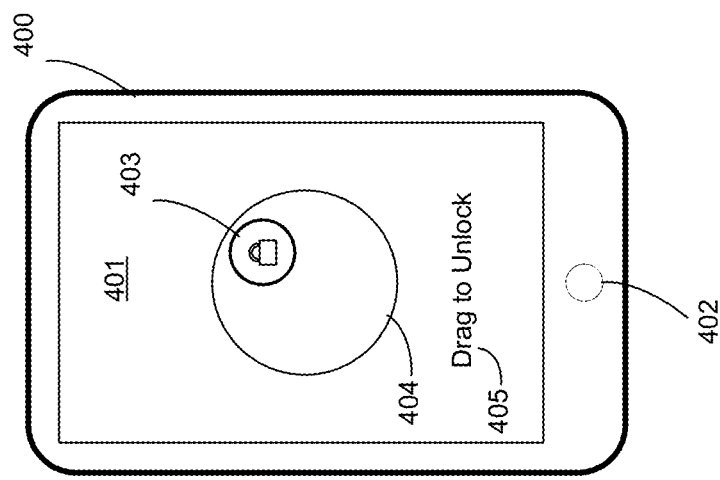
FIGS. 4D through 4F depict an example of operation of a movable user interface object for unlocking a device according to another embodiment, wherein a threshold boundary is defined as a circle.
Figure 4E:
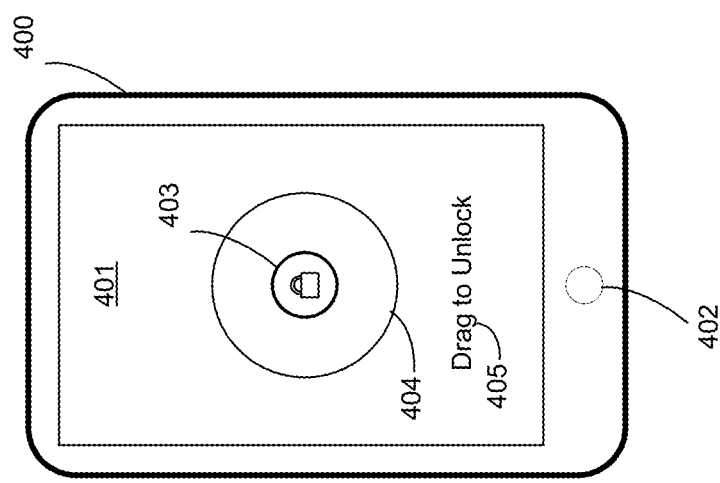
Figure 4D:
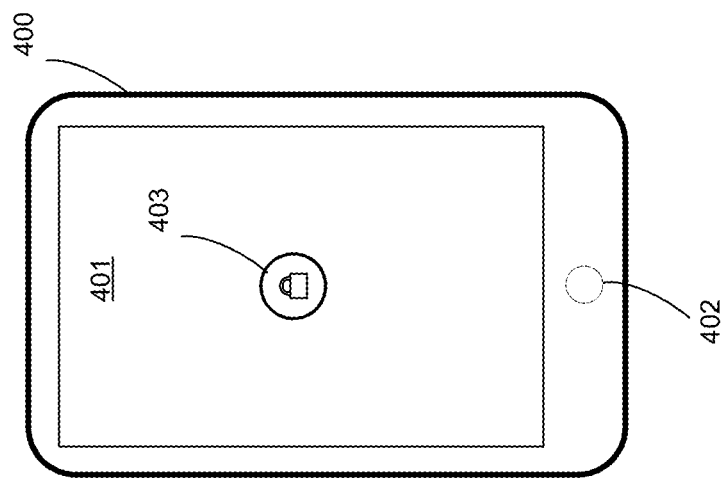

FIGS. 4D through 4F depict an alternative embodiment wherein threshold boundary 404 is defined as a circle surrounding the origin of movable object 403. Thus, in this embodiment the user can drag object 403 in any desired direction; once object 403 has been dragged sufficiently far from its origin to cross threshold boundary 404, device 400 is unlocked. FIG. 4D depicts movable object 403 in its starting position, or origin, according to one embodiment. FIG. 4E depicts screen 401 after user has initiated contact with screen 401, so that threshold boundary 404 appears, along with text 405 informing user as to how to unlock device 400, according to one embodiment. FIG. 4F depicts screen 401 after user has started dragging object 403 toward threshold boundary 404.

Figure 4I:
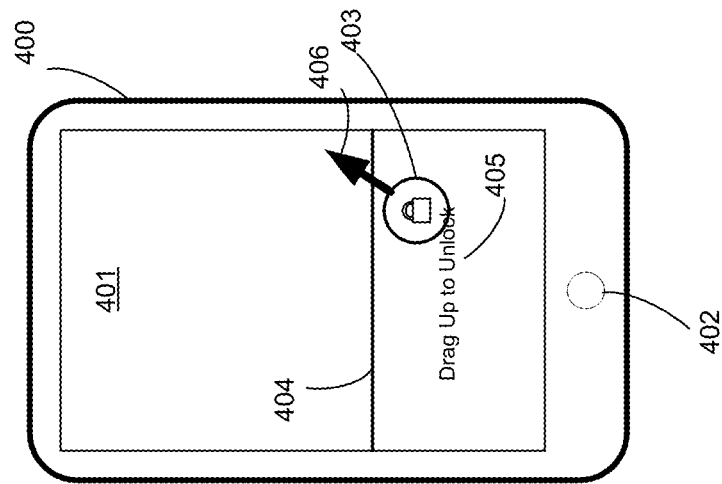
FIGS. 4G through 4I depict an example of operation of a movable user interface object for unlocking a device according to yet another embodiment, wherein a threshold boundary is defined as straight line.
Figure 4H:
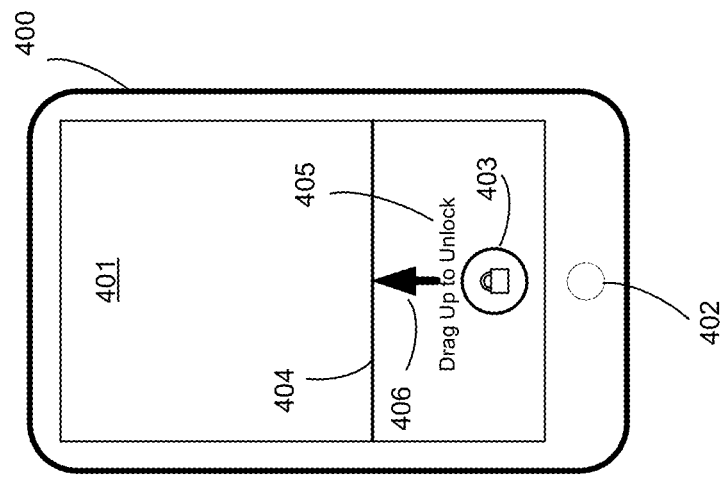
Figure 4G:
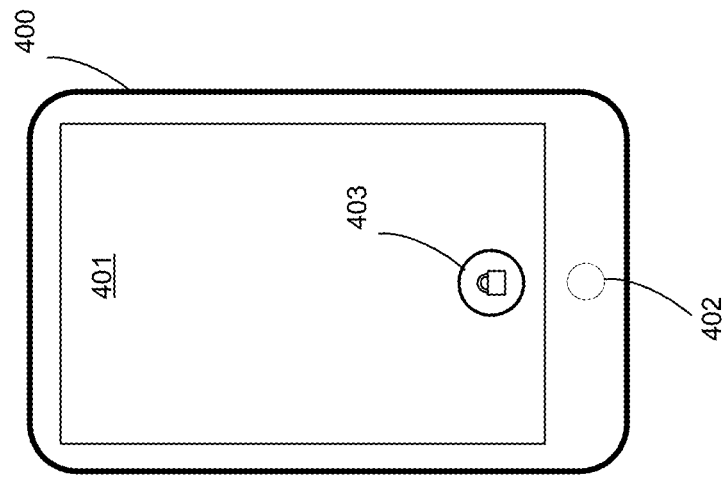

FIGS. 4G through 4I depict an alternative embodiment wherein threshold boundary 404 is defined as a line across screen 401 at some distance from the origin of movable object 403. FIG. 4G depicts movable object 403 in its starting position, or origin, according to one embodiment. FIG. 4H depicts screen 401 after user has initiated contact with screen 401, so that threshold boundary 404 appears, along with arrow 406 and text 405 informing user as to how to unlock device 400, according to one embodiment. FIG. 4I depicts screen 401 after user has started dragging object 403 toward threshold boundary 404. As shown in FIG. 4I, the user need not drag object 403 in any particular direction to unlock device 400, as long as object 403 touches or crosses threshold boundary 404.

As can be seen from the examples of FIGS. 4A though 4I, the present invention, in various embodiments, provides a flexible, easy-to-use mechanism for unlocking device 400. The movement of object 403 is not constrained to a particular axis, but can be moved in an arbitrary direction, so that users can more easily unlock device 400 without being forced to move object 403 in one particular direction. In addition, the mechanisms described herein, in various embodiments, do not suffer from a handedness problem associated with a single-direction slider as found in the prior art; both right-handed and left-handed individuals can use the unlock mechanism described herein without having to change preferences or settings on a device to suit their handedness. In one embodiment, the threshold boundary 404 can be reached by movement of object 403 in a variety of directions.

The above-described techniques can also be used to unlock device 400 when a voice call is received, in order to answer the call. In such an embodiment, the user drags object 403 according to any of the techniques described above; once object 403 has been dragged across threshold boundary 404 (which may or may not be made visible), device 400 is unlocked and a voice connection with the calling party is established. In one embodiment, device 400 is locked automatically when the voice call is terminated; in another embodiment, device 400 is locked automatically some period of time after the voice call is terminated.

Referring now to FIGS. 7A and 7B, there is shown an example of operation of a movable object for answering an incoming voice call, according to one embodiment. In FIG. 7A, display 401 indicates that an incoming call is being received, for example via text 701; in one embodiment, device 400 may vibrate and/or ring to further alert the user as to the incoming call. In one embodiment, display 401 identifies the calling party, for example via text 703 and/or picture 702 (which may be a photograph associated with the calling party or some other representation of the calling party). Movable object 403 appears, and may include an icon indicating an incoming voice call; for example, in FIG. 7A, movable object 403 includes an icon resembling a telephone handset. In one embodiment, text 405 is displayed to inform the user as to how to unlock device 400. Threshold boundary 404 may be displayed, in one embodiment.

Once the user has dragged object 403 across threshold boundary 404, device 400 is unlocked and a voice connection with the calling party is established. FIG. 7B depicts an example of display 401 during a voice call, according to one embodiment. In one embodiment, display 401 includes any or all of the following elements during a voice call:

- Identification of calling party, including name and telephone number 703, and picture 702;
- Hang-up icon 708, for terminating the call;
- Speaker button 704, for toggling between handset speaker (or earphone) and speakerphone;
- Mute button 705, for muting the microphone (not shown);
- Keypad button 706, for providing access to a virtual keypad (not shown), for example for dialing dual-tone multi-frequency (DTMF) tones;
- Add call button 707, for adding another party to the voice call.

Figure 7C:
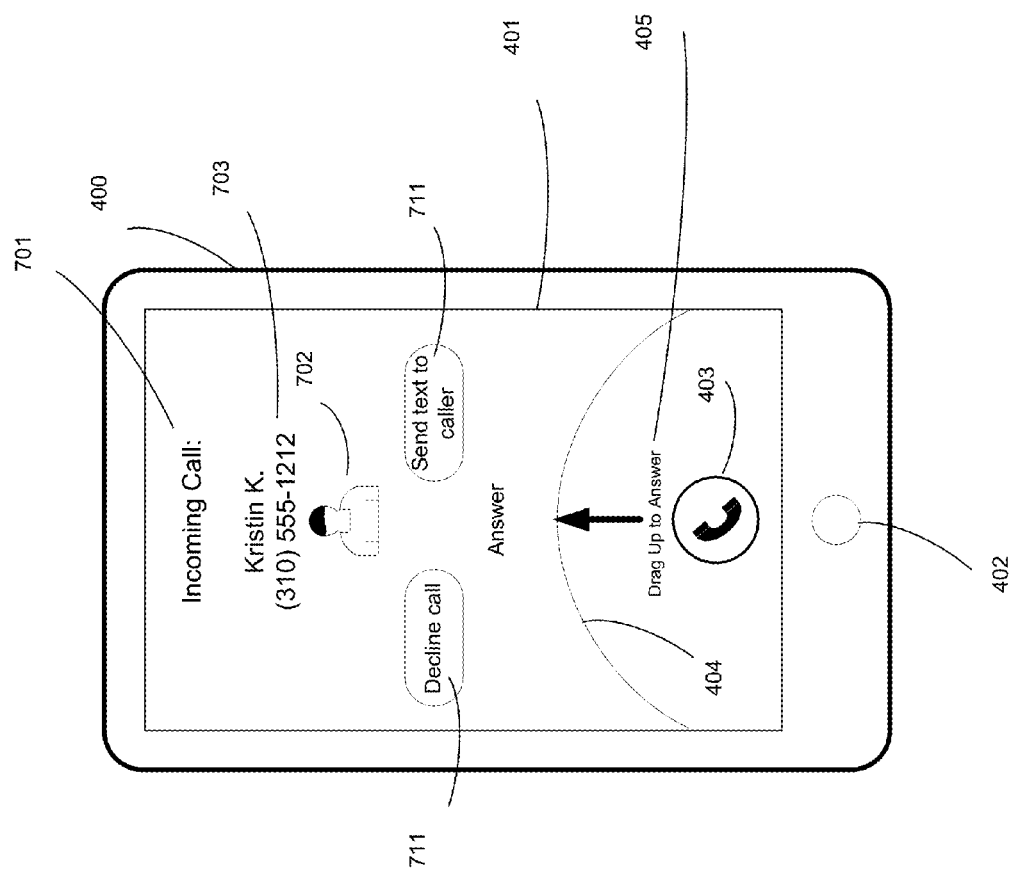
FIG. 7C depicts an example of a screen providing various options for handling an incoming voice call, according to one embodiment.

In one embodiment, when an incoming call is received, the user can be presented with a user interface that allows the user to specify how the call should be handled. Referring now to FIG. 7C, there is shown an example of display 401 when an incoming call is received, according to one embodiment. As described above in connection with FIG. 7A, the user can answer the call by dragging object 403 upward past threshold 404. However, if the user wishes to decline or ignore the call, or to handle the call in some other way, he or she can drag object 403 to one of regions 711 on screen 401. When the user releases object 403 on one of regions 711, the call is handled accordingly. For example, the call can be ignored or declined, or a text message can be sent to the calling party, or the call can be sent to voicemail, or the caller can be placed on hold; in various embodiments, different target regions 711 may be provided on screen 401 for performing these and other operations. In one embodiment, different target regions 711 (and/or arrangements of target regions 711) may be presented depending on the identity of the calling party. In one embodiment, a default call handling operation is performed (such as answering the call) if the user drags object 403 onto an area of screen 401 that is not part of any target region 711.

Target regions 711 can resemble buttons, if desired. However, in one embodiment, target regions 711 cannot be activated by pressing on them. Rather, to avoid unintentional activation, the user must drag object 403 onto one of target regions 711 in order to activate the corresponding call-handling function.

User Authentication

In various embodiments, for security purposes, a user can be required to authenticate him- or herself before gaining access to functionality on device 400. For example, in some embodiments, a user may be prompted to enter a personal identification number (PIN) and/or password to authenticate him- or herself before device 400 is unlocked. In other embodiments, a user may be permitted to access some functionality without authentication (for example to make or receive a voice call), but may not be permitted to access other functionality (such as emailing) until he or she authenticates him- or herself. Device 400 can be configured so that the user can turn on or off a security lock feature via a preferences screen or the like; when the security lock feature is on, authentication is required before an individual is granted access to device 400.

Figure 5B:
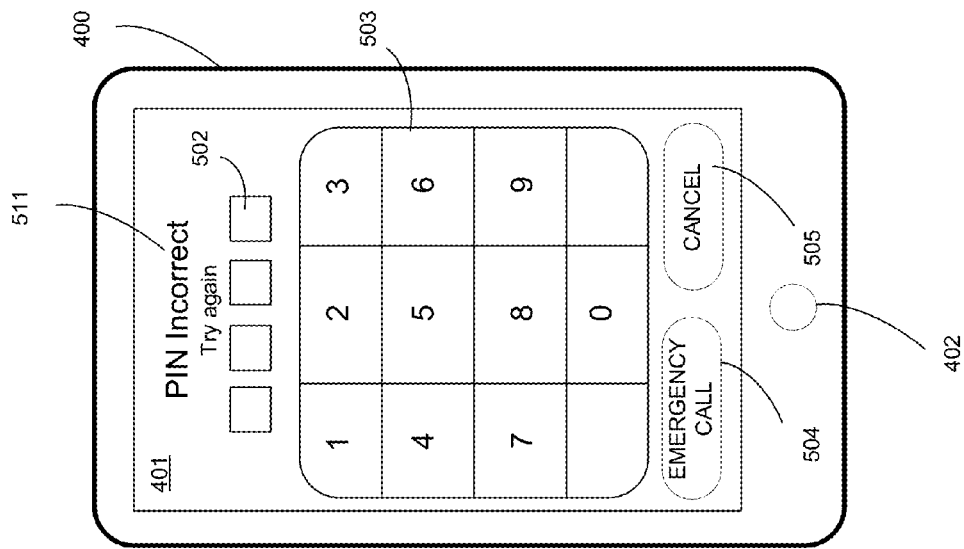
FIG. 5B depicts an example of a user interface for re-entering a PIN to unlock a device, according to one embodiment.
Figure 5A:
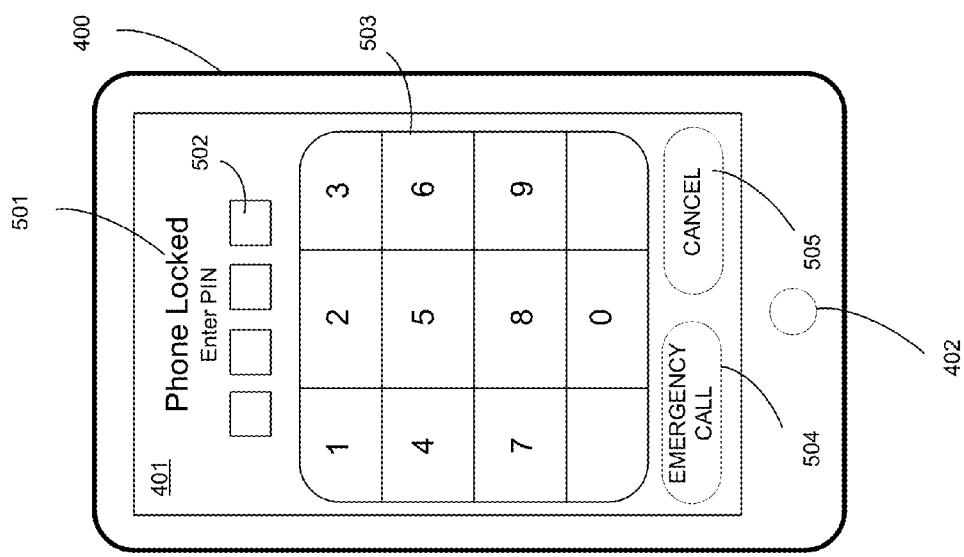
FIG. 5A depicts an example of a user interface for entering a PIN to unlock a device, according to one embodiment.

Referring now to FIG. 5A, there is shown an example of a user interface to prompt a user to enter a PIN to unlock a device, according to one embodiment. In one embodiment, the interface shown in FIG. 5A is displayed after a user successfully unlocks device 400 using one of the unlocking mechanisms described above; in another embodiment, the interface shown in FIG. 5A is displayed in lieu of one of the unlocking mechanisms described above. In one embodiment, the user may specify when and whether the prompt for a PIN appears, for example via a preferences or options screen. For illustrative purposes, the example shown in FIG. 5A includes the following elements, although one skilled in the art will recognize that other arrangements and elements can be shown:

- Notification and prompt 501;
- PIN entry field 502 (shown in FIG. 5A as having four digits);
- Touch keypad 503 for entering PIN digits;
- Emergency call button 504 for providing limited access to telephone functionality in order to make an emergency call;
- Cancel button 505 to cancel the unlock operation.

If the user correctly enters the PIN, device 400 is unlocked. If the user's entry is incorrect, a retry screen is shown, such as the example of FIG. 5B. FIG. 5B contains the same elements as FIG. 5A, except that a new notification 511 informs the user that the previous entry was incorrect. In some embodiments, auditory and/or tactile feedback can be provided to reinforce the fact that the user's entry was incorrect.

In one embodiment, the user is permitted a predetermined number of PIN entry attempts, after which device 400 must be reset before being unlocked. In another embodiment, no such limit on PIN entry attempts exists. Such limits can be fixed, or can be specified by an authorized user via a preferences screen.

Figure 6B:
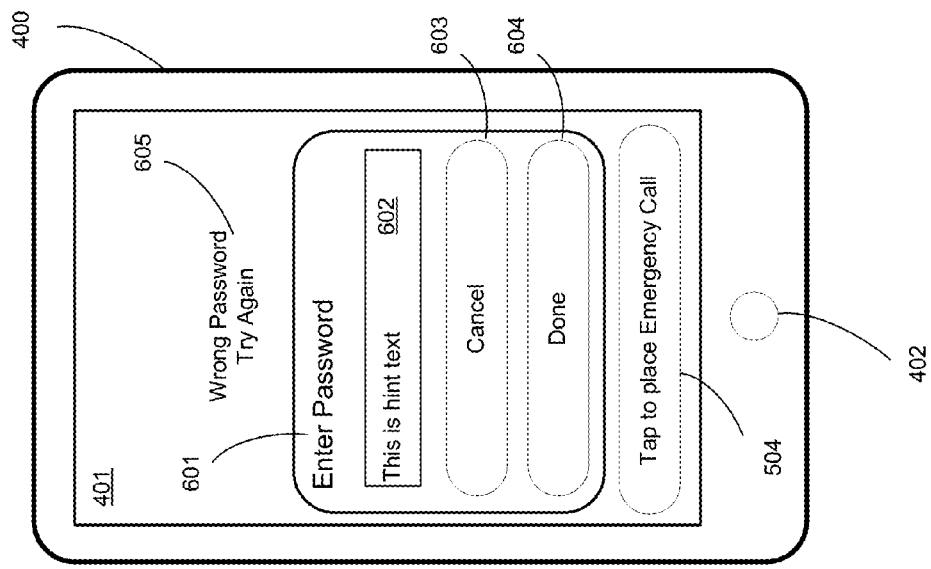
FIG. 6B depicts an example of a user interface for re-entering a password to unlock a device, according to one embodiment.
Figure 6A:
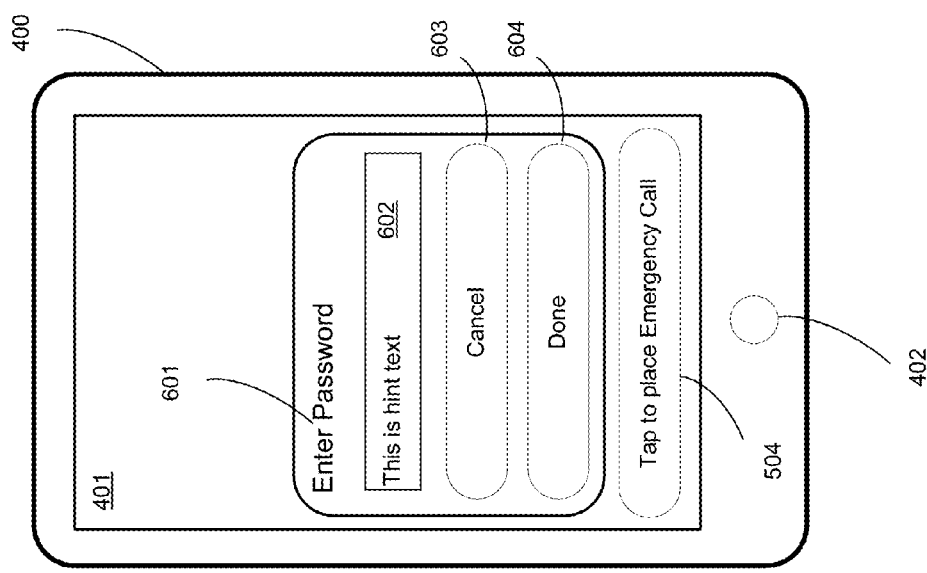
FIG. 6A depicts an example of a user interface for entering a password to unlock a device, according to one embodiment.

Referring now to FIG. 6A, there is shown an example of a user interface to prompt a user to enter a password to unlock a device, according to one embodiment. In one embodiment, the interface shown in FIG. 6A is displayed after a user successfully unlocks device 400 using one of the unlocking mechanisms described above; in another embodiment, the interface shown in FIG. 6A is displayed in lieu of one of the unlocking mechanisms described above. In one embodiment, the user may specify when and whether the prompt for a password appears, for example via a preferences or options screen. For illustrative purposes, the example shown in FIG. 6A includes the following elements, although one skilled in the art will recognize that other arrangements and elements can be shown:

- Prompt 501;
- Password entry field 602 (optionally including hint text to help the user remember the password);
- Cancel button 603 to cancel the unlock operation;
- Done button 604 to indicate that password entry is complete; and
- Emergency call button 504 for providing limited access to telephone functionality in order to make an emergency call.

In one embodiment, the user enters characters for the password via a keyboard (not shown) or other input device. The keyboard can be a physical one or a virtual (on-screen) one.

If the user correctly enters the password, device 400 is unlocked. If the user's entry is incorrect, a retry screen is shown, such as depicted in the example of FIG. 6B. FIG. 6B contains the same elements as FIG. 6A, except that a new notification 605 informs the user that the previous entry was incorrect. In some embodiments, auditory and/or tactile feedback can be provided to reinforce the fact that the user's entry was incorrect.

In one embodiment, the user is permitted a predetermined number of password entry attempts, after which device 400 must be reset before being unlocked. In another embodiment, no such limit on password entry attempts exists. Such limits can be fixed, or can be specified by an authorized user via a preferences screen.

In one embodiment, even if the security lock feature is turned on, a user can still answer an incoming voice call without entering a password or PIN. To answer the voice call, the user unlocks device 400 as described above in connection with FIG. 7A. However, if the user attempts to launch an application or perform certain other functions while on the call (or after the call has termination), the user must authenticate him- or herself (for example by entering a password or PIN) before access to such functions is granted. Details are provided below in connection with FIG. 3.

Alerts While Locked

According to various embodiments of the present invention, certain alerts, or event notifications, can be presented to a user while device 400 is locked. The user can be notified as to email messages, text messages, instant messages, voicemail messages, status events, alerts, alarms, or the like. In some embodiments, certain types of alerts may be suppressed for security reasons, so as to avoid displaying sensitive information on the screen prior to user authentication. In some embodiments, the user can specify what types of alerts may or may not be presented while the device is locked.

In one embodiment, screen 401 displays only one alert of each type, even if more than one alert of a given type is pending. For example, in one embodiment, if several alerts are pending, the most recent alert is displayed, along with a quantity indicator showing how many alerts of the type are pending. In one embodiment, the quantity indicator shows how many alerts are pending that the user has not yet checked or dismissed. The various types of alerts can include, for example, reminders of calendar events; messages (including instant messages, email messages, voicemail messages, text messages, or the like); missed calls; device status alerts; task reminders; and the like.

In one embodiment, the quantity indicator is shown only if at least two alerts of a particular type are pending. In another embodiment, the quantity indicator is omitted.

In one embodiment, display screen 401 may be shut off to conserve power, for example after some period of inactivity or in response to a user command. In such an embodiment, alerts can be shown when device 400 wakens, for example in response to the user touching screen 401 or pressing a "wake" button or a power button or some other control.

Figure 8D:
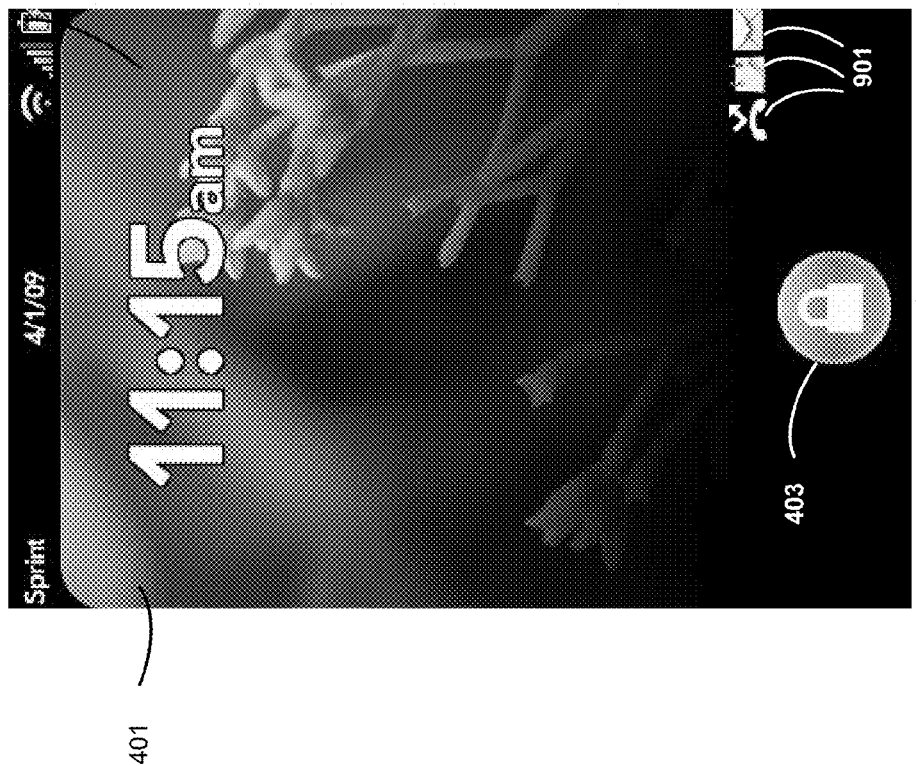

Referring now to FIGS. 8A through 8F, there are shown examples of screen displays for showing alerts while device 400 is locked, according to one embodiment. In FIG. 8A, an alert 801A is displayed for a new electronic business card that has arrived (also referred to as a Vcard). A quantity indicator 802A shows how many alerts (of a given type) are pending, for example to indicate how many Vcards have arrived that have not yet been viewed or dismissed by the user. In the example, the number 3 is shown, indicating that three new Vcards have arrived.

In one embodiment, as depicted in FIG. 8A, alert 801A shows a summary of the most recent instance of the alert type is displayed. In one embodiment, a user can tap on alert 801A to view other pending alerts 801A of the same type; each tap causes screen 401 to display an alert 801A for the next pending event of a given type. Thus, in the example of FIG. 8A, each tap on alert 801A would cause screen 401 to cycle through the three pending Vcard alerts 801A.

In one embodiment, alerts 801 are not dismissed until the user unlocks device 400 and views or dismisses the item associated with the alert. In another embodiment, some or all alerts 801 may be automatically dismissed under certain circumstances, such as for example after some period of time has elapsed since the alert was issued.

In FIG. 8B, three alerts 801A, 801B, 801C are shown, representing events of different types. Alert 801A summarizes the most recently received Vcard, with a quantity indicator 802A showing that three Vcards have arrived. Alert 801B summarizes the most recent calendar event having a reminder, with a quantity indicator 802B showing that three pending calendar events have reminders; again, in one embodiment, the user can tap on alert 801B to cycle through the pending calendar events. Alert 801C summarizes the most recent missed call, including an indication of the calling party and the time/date of the call. No quantity indicator is shown for alert 801C; in one embodiment, this signifies that only one event of that type (missed call) has taken place.

In one embodiment, a user can control media playback while device 400 is locked. For example, basic controls such as pause, skip forward, and skip back can be presented on screen 401, along with an indication of a currently playing song (or other media item), including title, artist, album, cover art, or any combination thereof. FIG. 8B depicts an example of media control interface 803 that is provided while screen 401 is locked, in one embodiment. In one embodiment, interface 803 is presented in a compact form so as to occupy substantially the same amount of screen space as an alert 801. In one embodiment, the user can expand interface 803 to reveal more controls for media playback on device 400 without necessarily unlocking device 400.

The examples of FIGS. 8A and 8B include a representation of movable object 403, which operates as described above in connection with any of FIGS. 4A through 4I. Accordingly, the user can unlock device 400 by dragging object 403. In one embodiment, dragging object 403 initiates a display similar to FIGS. 4B and 4C, or 4E and 4F, or 4H and 4I, as described above, to provide appropriate feedback for the unlock operation. In one embodiment, the displayed feedback is overlaid on displayed alerts 801, for example with a transparency or translucency effect. In another embodiment, the displayed feedback temporarily replaces displayed alerts 801.

In one embodiment, when an incoming call is detected, a display similar to that of FIGS. 8A and/or 8B is superimposed on an incoming call notification and caller identification screen as depicted in FIG. 7A.

In one embodiment, when device 400 is in a locked state, screen 401 displays new alerts 801 corresponding to events that have occurred since the last time device 400 was locked or powered on, but does not display alerts 801 corresponding to items that have already been viewed or dismissed by the user. For example, an alert 801 would be shown for an unread email message but not for an email message that the user has already read.

In another embodiment, when device 400 is in a locked state, screen 401 displays new alerts 801 corresponding to events that have occurred since the last time device 400 was locked or powered on. For alerts 801 corresponding to items that have already been viewed by the user, a compact representation of the alert 801 is shown, such as an icon. For example, an alert 801 would be shown for an unread email message, and a compact representation (such as an icon) would be shown for an email message that the user has already read.

Figure 8C:
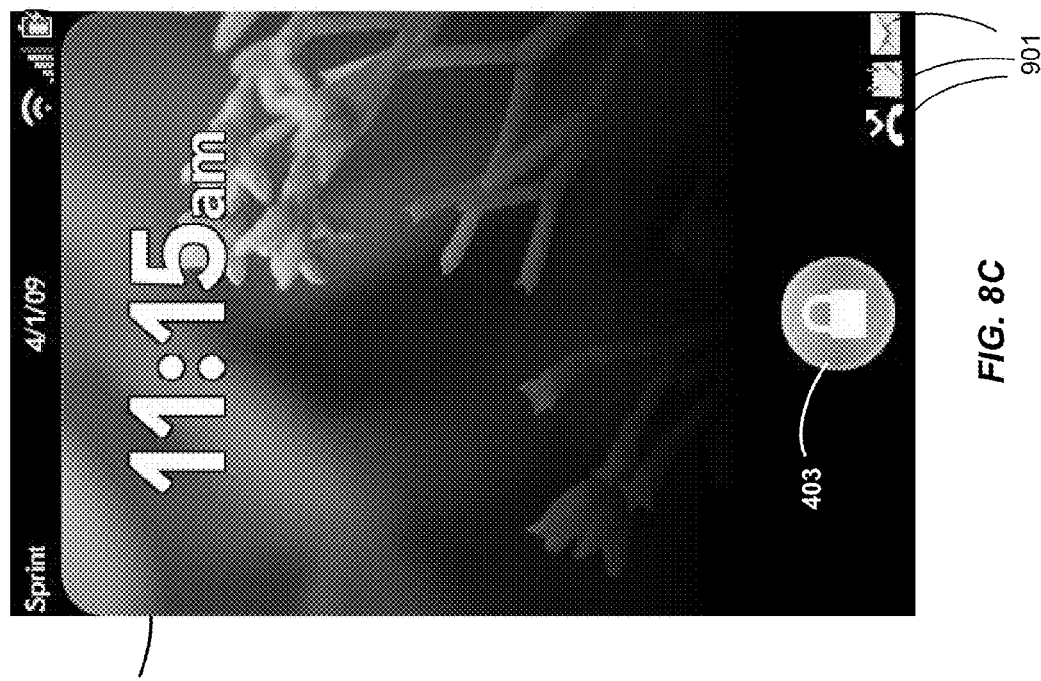

Referring now to FIG. 8C, there is shown an example of screen 401 when device 400 is in a locked state, including compact representations of alerts in the form of icons 901. In one embodiment, an alert is shown as icons 901 if the corresponding event occurred after the last time device 400 was locked or powered on, the alert is shown in its full state as depicted in FIG. 8A or 8B.

Figure 8F:
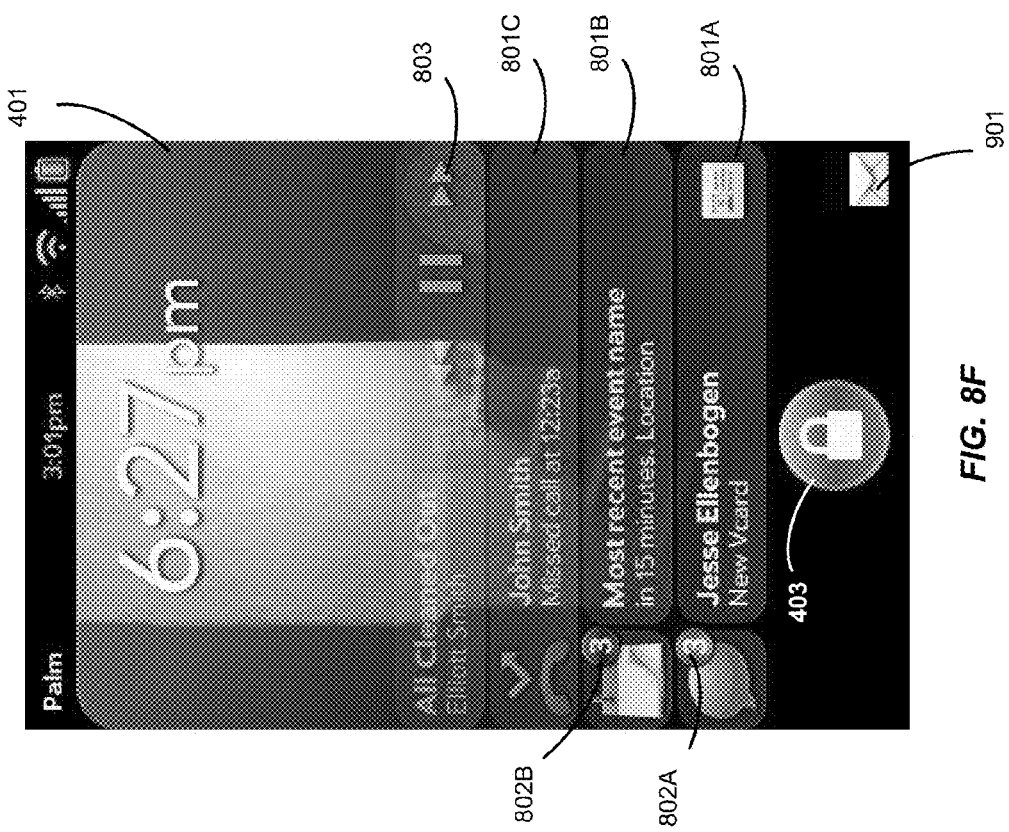
Figure 8E:
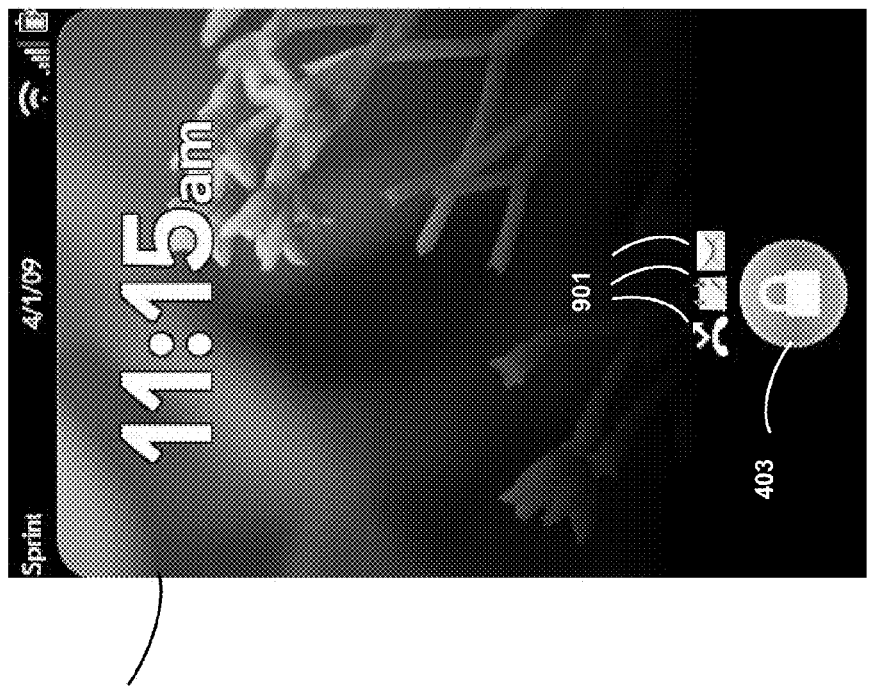

FIGS. 8D and 8E depict alternative placements of icons 901, although one skilled in the art will recognize that many other arrangements are possible.

Referring now to FIG. 8F, there is shown an example of screen 401 when device 400 is in a locked state, including icon 901 for an email message, and full alerts 801A, 80B, 801C for various other events. Such a display may be presented, for example, if the email message represented by icon 901 has already been read (or if the email message arrived before the last time device 400 was locked or powered on). Alerts 801A, 80B, 801C indicate events that took place after the last time device 400 was locked or powered on. In this manner, once a user has viewed an alert 801 in its full form, the alert 801 is converted to an icon 901 (or is dismissed entirely).

In one embodiment, icons 901 can include numeric indicators of the quantity of a particular type of event, in the manner described above for numeric indicators 802A, 802B for alerts 801.

In one embodiment, when device 400 is unlocked, alerts 801 and/or icons 901 are removed from screen 401. In another embodiment, when device 400 is unlocked, full alerts 801 are removed and replaced by an alert summary including icons 901. This alert summary can be displayed continuously while the user interacts with device 400.

Figure 9B:
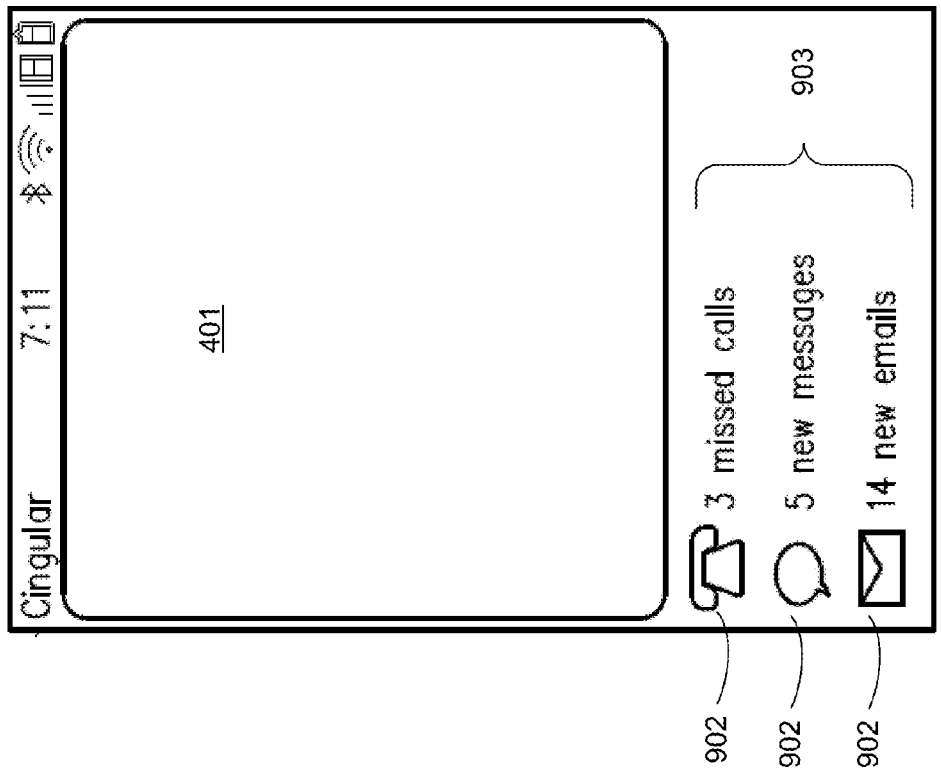
FIGS. 9A through 9C depict examples of a display of alerts while a device is unlocked, according to one embodiment.
Figure 9A:
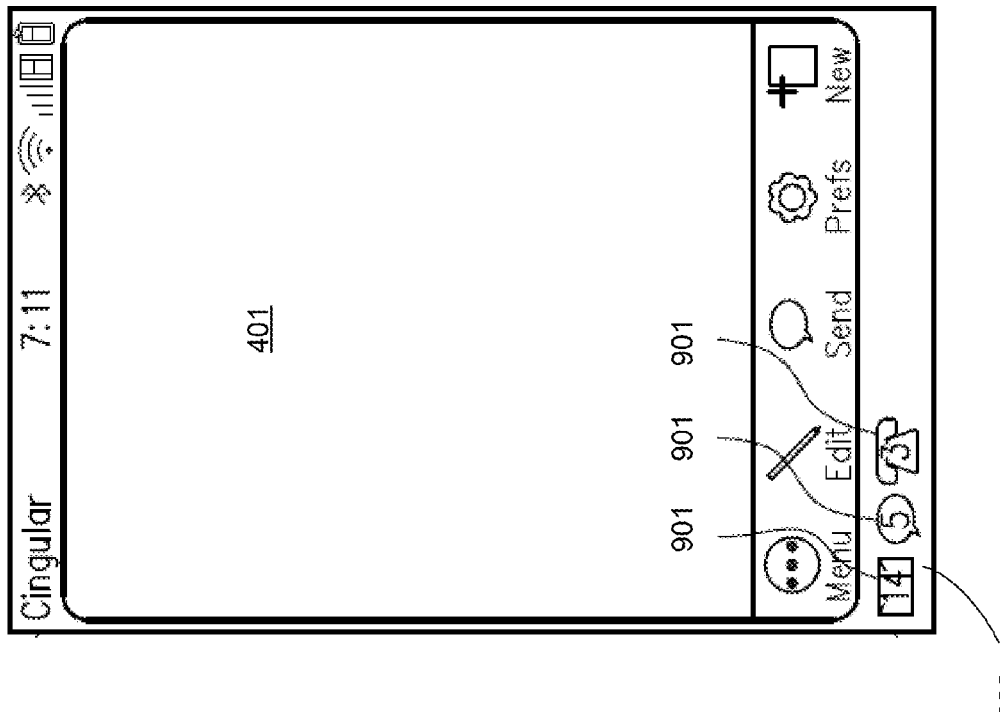

One example of an alert summary is described in related U.S. patent application Ser. No. 12/200,782, filed Aug. 28, 2008, for "Notifying a User of Events in a Computing Device", the disclosure of which is incorporated herein by reference. Referring now to FIG. 9A, there is shown an example of an alert summary 900 displayed on screen 401 after device 400 has been unlocked. In one embodiment, alert summary 900 includes a series of alert icons 901; in one embodiment, these alert icons 901 correspond to alerts 801 that are displayed when device 400 is locked, as shown in FIG. 8B. In one embodiment, alert icons 901 are shown in alert summary 900 in a compact form, as depicted in FIG. 9A, so as to occupy minimal space on display 101. For example, as shown in FIG. 9A, alert summary 900 may contain an alert icon 901 for each type of alert, wherein each icon 901 includes a numeric indicator of the number of pending alerts of that type. In the example, alert icons 901 indicate that fourteen incoming email messages, five text messages, and three missed voice calls have been received. One skilled in the art will recognize that alert summary 900 can take many other forms.

In one embodiment, if more than one such icon 901 is to be displayed, they are shown adjacent to each other. This display is referred to as a "dashboard summary", "event summary", or "alert summary".

In one embodiment, alert summary 900 is expandable. The user can tap (or otherwise activate) alert summary 900 to cause it to expand. Referring now to FIG. 9B, there is shown an expanded version 903 of alert summary 900, including more detailed alerts 902.

Figure 9C:
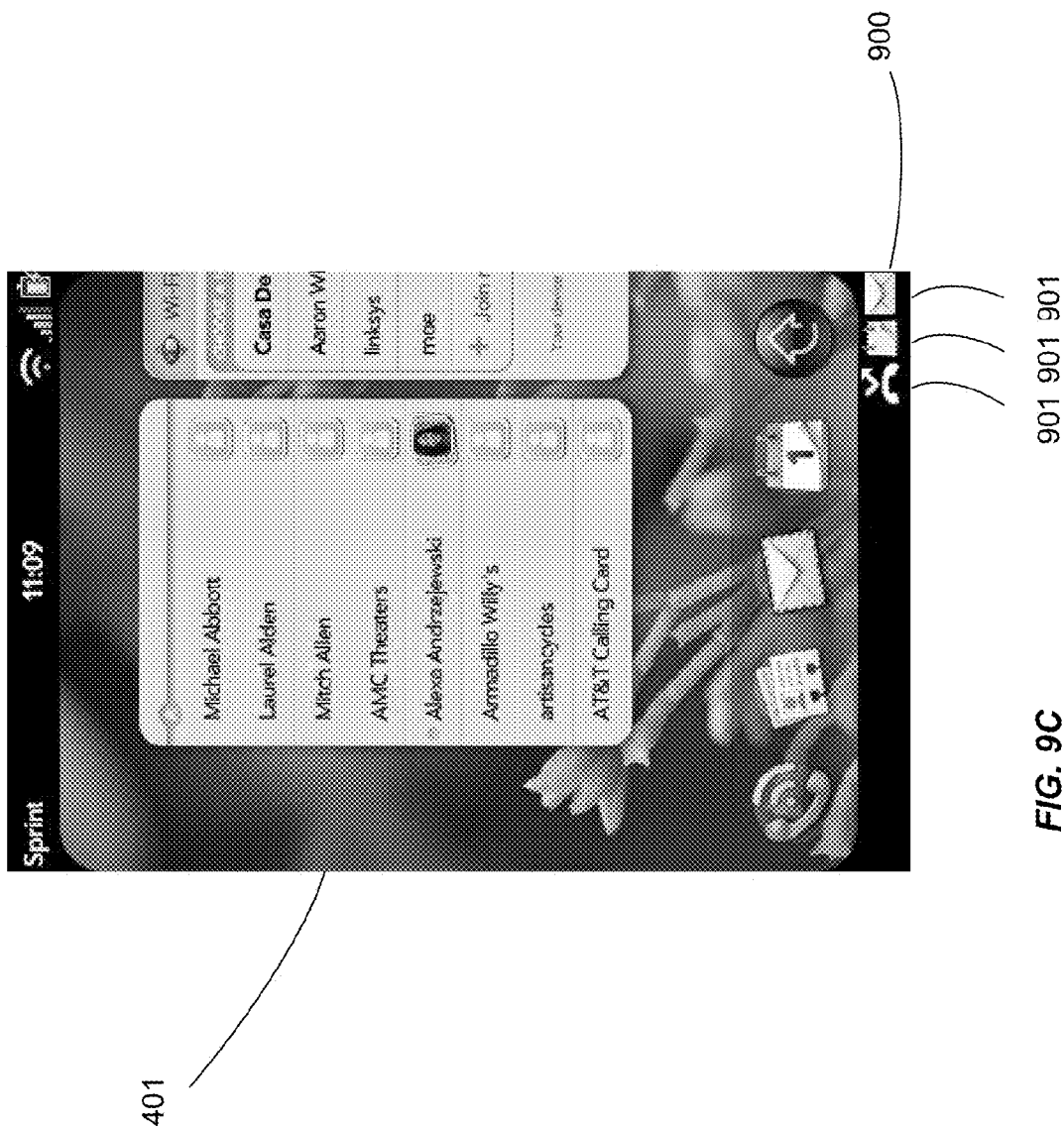

Referring now to FIG. 9C, there is shown another example of an alert summary 900 displayed on screen 401 after device 400 has been unlocked. In this embodiment, the numeric indicators in alert icons 901 are omitted, so that each icon 901 indicates that one or more of a particular type of alert is pending.

In some situations, it may be undesirable to display some or all alerts 801 when a device 400 is locked. For example, the information potentially included in such alerts may be sensitive or confidential, in which case a user would not want device 400 to display such alerts while locked, since an unauthorized individual would then be able to see the sensitive or confidential information without authenticating him- or herself. Accordingly, in one embodiment, when locked, device 400 does not show alerts 801, if device 400 is configured to require authentication before unlocking. In another embodiment, when device 400 is locked and configured to require authentication before unlocking, device 400 shows compact representations such as icons 901 (as depicted in FIGS. 8C through 8E) but does not show full alerts 801; in this manner, device 400 avoids divulging any detailed information concerning events prior to unlocking. In yet another embodiment, a user can specify, via a preferences screen or the like, whether or not alerts 801 should be shown, and in what format (full or icon), when device 400 is locked.

Examples of Alerts

The following are examples of alerts that can be displayed while device 400 is locked. One skilled in the art will recognize that these are merely examples and that many other types of alerts can be displayed while device 400 is locked, without departing from the essential characteristics of the claimed invention.

Incoming Call. In one embodiment, this alert appears when device 400 receives an incoming call. The alert is dismissed when the user answers, declines, or ignores the call, or when the caller hangs up, or when the call is transferred to voicemail. If the call was declined or ignored, a "missed call" alert is presented. In one embodiment, if the user presses the power button (not shown), the call is ignored. The power button can be at any location on device 400, including at the top, bottom, or side, on the face of device 400, or on the back of device 400.

Missed Call. In one embodiment, this alert appears after a call is declined or ignored. In one embodiment, the alert is dismissed after some period of time, such as after 10 minutes. Upon dismissal, the alert moves to the alert summary. In one embodiment, the user can dismiss the alert by pressing the power button (not shown).

Calendar Alert. In one embodiment, this alert is presented in response to a calendar event that is associated with a reminder. In one embodiment, the alert is dismissed at the end of the calendar event. Upon dismissal, the alert moves to the alert summary. In one embodiment, the user can dismiss the alert by pressing the power button (not shown).

Power Off. In one embodiment, this alert is presented when the user holds down the power button (not shown) or otherwise initiates shutdown of device 400. In one embodiment, the alert is dismissed when screen 401 turns off.

USB Connection. In one embodiment, this alert is presented when device 400 is connected to another device, such as a personal computer, via an interface such as a USB cable. In one embodiment, the alert is dismissed after some period of time, such as after one minute. Upon dismissal, the alert moves to the alert summary. In one embodiment, the user can prevent synching, so that device 400 draws charge via the USB cable but does not exchange data with the connected device, by pressing the power button (not shown). In one embodiment, while device 400 is being charged, it is unlocked, although a PIN or password is still required if the security lock feature is active, requiring an individual to authenticate him- or herself before being granted access to device 400.

Volume. In one embodiment, a volume up/down alert showing, for example, a representation of the current volume level, is presented in response to a change in volume, such as when the user manually manipulates a volume control (not shown) on device 400. In one embodiment, the alert is dismissed after some period of time, such as after two seconds.

Low Battery Warning. In one embodiment, this alert is presented when the battery (not shown) has less than a threshold amount of power remaining. In one embodiment, the alert is dismissed when the low battery condition no longer exists, or when the battery loses all power. In one embodiment, the user can dismiss the alert by pressing the power button (not shown).

Low Memory Warning. In one embodiment, this alert is presented when the available memory of device 400 is lower than a threshold amount. In one embodiment, the alert is dismissed when the low memory condition no longer exists. In one embodiment, the user can dismiss the alert by pressing the power button (not shown).

Network Unavailable. In one embodiment, this alert is presented when device 400 is unable to connect to a wireless network. In one embodiment, the alert is dismissed when the network connection is reestablished, or after some period of time, such as after five minutes. In one embodiment, the user can dismiss the alert by pressing the power button (not shown).

Method of Operation

Figure 2:
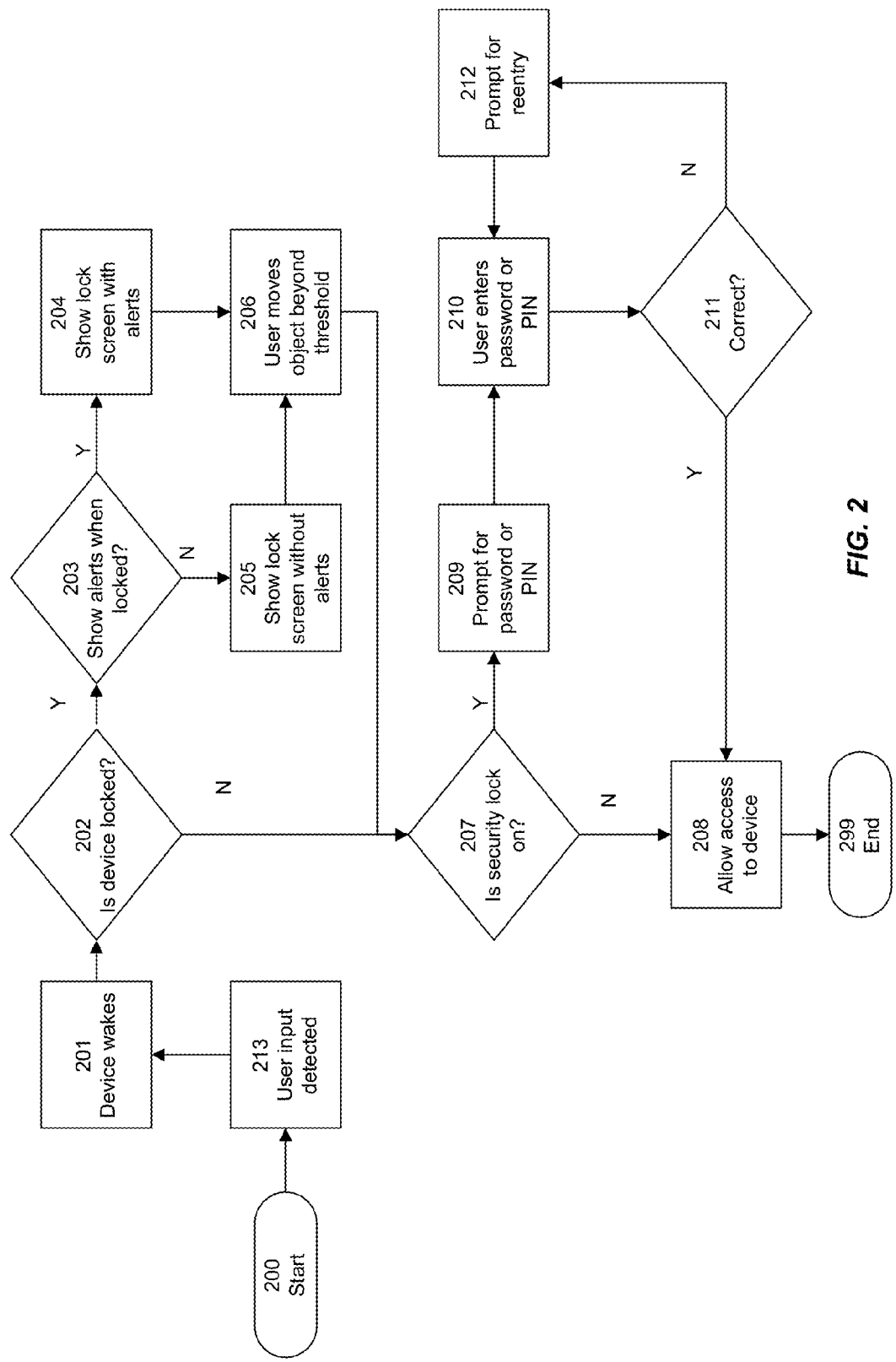
FIG. 2 is a flow diagram depicting a method for unlocking a device according to one embodiment of the present invention.

Referring now to FIG. 2, there is shown a flow diagram depicting a method for unlocking a device according to one embodiment of the present invention.

Initially, device 400 may be in a sleep mode wherein display screen 401 is shut off to conserve power. Alternatively, device 400 may already be awake when the method begins.

User input 213 is detected at device 400; this user input may be the user pressing button 103, or a dedicated power button or wake button, or the input may be the user touching screen 401.

If device 400 was in sleep mode, it wakes 201 in response to the user input. A determination is made 202 as to whether device 400 is locked. In one embodiment, if device 400 is connected to a dock or charging station it is automatically considered unlocked, since it is unlikely that the user would be charging the device while carrying it in a pocket or purse, or on a belt, or in some other environment where it might be inadvertently activated. If device 400 is unlocked, device proceeds to step 207 as described below.

If, in step 202, device 400 is locked, a determination is made 203 as to whether alerts should be displayed while device 400 is locked. In one embodiment, this determination 203 depends on user-specified preferences. If alerts are to be displayed, device 400 shows 204 a lock screen with alerts, as depicted above in connection with FIG. 8A or 8B. If alerts are not to be displayed, device 400 shows 205 a lock screen without alerts, as depicted above in connection with FIG. 4A, 4D, or 4G.

Once the lock screen is displayed, the user can move object 403 as described above in order to unlock device 400. As the user moves object 403, feedback may be provided as described above.

Once the user moves 206 object 403 beyond threshold boundary 206 (or moves object 403 a sufficient distance from its origin), device 400 may be unlocked. However, as described above, in some embodiments a security lock feature may be implemented that requires an individual to authenticate him- or herself before being granted access to device 400.

If, in step 207, no security lock is active, the user is granted access 208 to device 400.

If, in step 207, a security lock is active, the user is prompted for authentication prior to being granted access. In one embodiment, device 400 prompts 209 the user for entry of a password or PIN, as described above in connection with FIGS. 5A and/or 6A. The user enters 210 a password or PIN. In step 211, device 400 determines whether the password or PIN is correct; if so, the user is granted 208 access to device 400. If the entered password or PIN is incorrect, the user is prompted 212 to re-enter the password or PIN, as described above in connection with FIGS. 5B and/or 6B.

As described above, in one embodiment, the user is permitted a predetermined number of PIN entry attempts, after which device 400 must be reset before being unlocked. In another embodiment, no such limit on PIN entry attempts exists. Such limits can be fixed, or can be specified by an authorized user via a preferences screen.

In one embodiment, when prompted to enter a password or PIN, the user can select an emergency call button 504, as described above in connection with FIGS. 5A, 5B, 6A, and 6B. In one embodiment, selecting this button opens a dial pad which provides access to emergency numbers only. For example, "911" can be listed as an emergency number that the user can dial by selecting a button.

In one embodiment, a user can cancel an unlock or authentication operation by selecting a cancel button 505 or 603, as described above in connection with FIGS. 5A, 5B, 6A, and 6B. If the user selects cancel button 505 or 603, device 400 returns to sleep mode or to locked mode.

Figure 3:
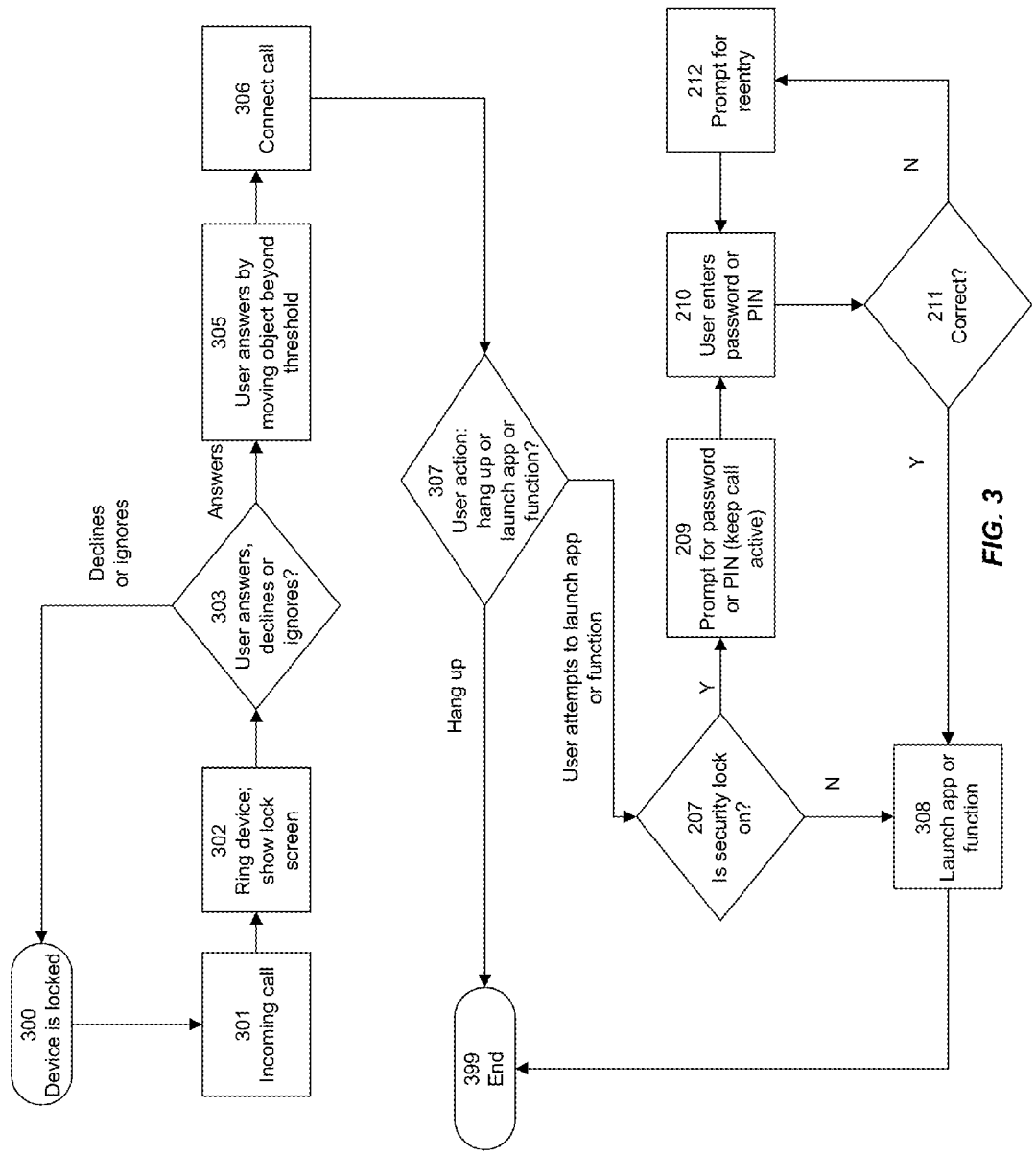
FIG. 3 is a flow diagram depicting a method for unlocking a device to accept an incoming voice call, according to one embodiment of the present invention.

Referring now to FIG. 3, there is shown a flow diagram depicting a method for unlocking a device to accept an incoming voice call, according to one embodiment of the present invention.

Initially, device 400 may be in a sleep mode wherein display screen 401 is shut off to conserve power. Alternatively, device 400 may already be awake when the method begins.

An incoming call is detected 301. Device 400 rings 302, vibrates, lights up, or otherwise informs the user of the incoming call. Device 400 shows 302 the lock screen, which may also identify the calling party as described above in connection with FIG. 7A. In one embodiment, alerts may be superimposed on the display depicted in FIG. 7A, if appropriate.

If, in step 303, the user declines or ignores the call, device 400 remains locked. The user may ignore the call by doing nothing, or may decline the call by pressing a "silent" or "decline" button or on-screen control. In one embodiment, the user can decline the call by doing any of the following:

Touching the screen;
    Pressing button 402;
    Pressing a key on a keyboard, if device 400 is equipped with a keyboard (not shown);
    Placing device 400 face down on a surface;
    Dragging or moving object 403 to an area on screen 401 designated for a "silent" or "decline" function; or
    Pressing a power button (not shown).

One mechanism for answering the call in step 303 is to move 305 object 403 past threshold boundary 404, as described above in connection with FIG. 7A. Device 400 then connects 306 the call. In one embodiment, a display such as that described in connection with FIG. 7B is shown, identifying the calling party, and providing access to functions such as hanging up, engaging speakerphone, muting the call, entering keypad data, and/or adding a call.

When the user hangs up 307 (for example by selecting a hang-up button 708, as shown in FIG. 7B), the call ends 399.

In one embodiment, the user can launch an application or function during the call. For example, a user may look up a contact, surf the web, or perform some other function. The user initiates such launching from a launch screen, or by entering a gesture, or by some other means. In response to the user attempting to launch an application or function, device 400 determines 207 whether a security lock is active. If no security lock is active, the application or function is launched 308.

If, in step 207, a security lock is active, the user is prompted for authentication. In one embodiment, device 400 prompts 209 the user for entry of a password or PIN, as described above in connection with FIGS. 5A and/or 6A. The user enters 210 a password or PIN. In step 211, device 400 determines whether the password or PIN is correct; if so, the application or function is launched 308. If the entered password or PIN is incorrect, the user is prompted 212 to re-enter the password or PIN, as described above in connection with FIGS. 5B and/or 6B.

As described above, in one embodiment, the user is permitted a predetermined number of PIN entry attempts, after which device 400 must be reset before being unlocked. In another embodiment, no such limit on PIN entry attempts exists. Such limits can be fixed, or can be specified by an authorized user via a preferences screen.

In one embodiment, a user can cancel an unlock or authentication operation by selecting a cancel button 505 or 603, as described above in connection with FIGS. 5A, 5B, 6A, and 6B. If the user selects cancel button 505 or 603, the launch of the application or function is canceled, and the call continues.

In the above description, reference is made to "buttons" and other user interface objects. One skilled in the art will recognize that such objects can be actual physical buttons and other objects, or they may be on-screen representations that can be manipulated and/or activated by a user.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for unlocking an electronic device, the method being performed by one or more processors and comprising:
   determining that the electronic device is locked;
   displaying a user interface object at an origin position on a display screen of the electronic device;
   displaying a threshold boundary on the display screen in response to user interaction with the user interface object, the displayed threshold boundary indicating a boundary that the user interface object is to move beyond for the electronic device to unlock;
   receiving a user input indicating movement of the user interface object;
   moving the user interface object in response to the user input; and
   in response to the user interface object being moved beyond the displayed threshold boundary, unlocking the electronic device.

2. The method of claim 1, wherein the electronic device comprises a mobile device.

3. The method of claim 1, wherein, the display screen includes a touch-sensitive surface.

4. The method of claim 1, wherein the user input is received using one or more of:
   a touch-sensitive surface;
   a pointing device;
   a mouse;
   a touchpad;
   a trackball;
   a joystick;
   a keyboard;
   a rocker switch;
   a dial; or
   a directional keypad.

5. The method of claim 1, wherein unlocking the electronic device comprises granting access to at least one functional feature of the electronic device.

6. The method of claim 5, further comprising prior to unlocking the electronic device, denying access to the at least one functional feature of the electronic device.

7. The method of claim 1, wherein the electronic device is at least one of:
   a cellular telephone;
   a smartphone;
   a handheld computer;
   a personal computer;
   a personal digital assistant; or
   a kiosk.

8. The method of claim 1, wherein the displayed threshold boundary comprises at least one of:
   an arc;
   a circle substantially enclosing the origin position; or
   a line.

9. The method of claim 1, wherein the user interface object can be moved in substantially any direction on the display screen.

10. The method of claim 1, wherein the displayed threshold boundary is reachable from the origin position by movement of the user interface object in any of a plurality of directions.

11. The method of claim 1, further comprising returning the user interface object to the origin position when the user interface object is not moved beyond the displayed threshold boundary.

12. The method of claim 1, further comprising displaying at least one alert while the electronic device is locked, wherein the at least one alert is displayed concurrently with the user interface object, and wherein the at least one alert includes a notification of at least one event.

13. The method of claim 12, wherein displaying at least one alert comprises:
   in response to the at least one alert representing an event that occurred subsequent to a most recent locking of the electronic device, displaying the at least one alert in a first format; and
   in response to the at least one alert representing an event that occurred prior to the most recent locking of the electronic device, displaying the at least one alert in a second format, wherein the second format is more compact than the first format.

14. The method of claim 12, wherein displaying at least one alert comprises:
   in response to the at least one alert having not been dismissed, displaying the at least one alert in a first format; and
   in response to the at least one alert having been dismissed, displaying the at least one alert in a second format, wherein the second format is more compact than the first format.

15. The method of claim 12, wherein displaying at least one alert comprises:
   in response to the at least one alert representing an event that occurred subsequent to a most recent locking of the electronic device, displaying the at least one alert; and
   in response to the at least one alert representing an event that occurred prior to the most recent locking of the electronic device, suppressing display of the at least one alert.

16. A method for unlocking an electronic device, the method being performed by one or more processors and comprising:
   determining that the electronic device is locked;
   displaying a user interface object at an origin position on a display screen of the electronic device;
   displaying a threshold boundary on the display screen in response to user interaction with the user interface object, the displayed threshold boundary indicating a boundary that the user interface object is to move beyond for the electronic device to unlock;
   receiving a user input indicating movement of the user interface object;
   moving the user interface object in response to the user input; and
   in response to the user interface object being moved beyond the displayed threshold boundary:
      (i) prompting the user to enter a password in order to authenticate the user; and
      (ii) in response to authenticating the user, unlocking the electronic device.

17. The method of claim 16, further comprising displaying a message in response to user interaction with the user interface object, the message notifying the user to move the user interface object in order to unlock the electronic device.

18. A method for unlocking a locked electronic device to answer an incoming call, the method being performed by one or more processors and comprising:
   receiving an incoming call;
   displaying an indication of the incoming call;
   displaying a user interface object at an origin position on a display screen of the locked electronic device;
   displaying a threshold boundary on the display screen in response to user interaction with the user interface object, the displayed threshold boundary indicating a boundary that the user interface object is to move beyond for the locked electronic device to unlock to answer the incoming call;
   receiving a user input indicating movement of the user interface object;
   moving the user interface object in response to the user input; and
   in response to the user interface object being moved beyond the displayed threshold boundary, unlocking the locked electronic device and concurrently connecting the call.

19. The method of claim 18, wherein unlocking the locked electronic device comprises granting access to at least one functional feature of the locked electronic device in addition to connecting the call.

20. A computing device comprising:
   a display screen;
   one or more processors; and
   a memory operatively coupled to the one or more processors, the memory for storing instructions that, when executed by the one or more processors, cause the one or more processors to:
      determining that the electronic device is locked;
      display, on the display screen, a user interface object at an origin position;
      display, on the display screen, a threshold boundary in response to user interaction with the display screen, the displayed threshold boundary indicating a boundary that the user interface object is to move beyond for the electronic device to unlock;
      receive a user input indicating movement of the user interface object;
      moving the user interface object in response to the user input; and
      in response to the user input moving the user interface object beyond the displayed threshold boundary, unlocking the computing device.

21. The computing device of claim 20, wherein the user input is received from at least one of:
   a touch-sensitive surface;
   a pointing device;
   a mouse;
   a touchpad;
   a trackball;
   a joystick;
   a keyboard;
   a rocker switch;
   a dial; or
   a directional keypad.

22. The computing device of claim 20, wherein the user interface object can be moved in substantially any direction on the display screen.

23. The computing device of claim 20, wherein the displayed threshold boundary is reachable from the origin position by movement of the user interface object in any of a plurality of directions.

24. The computing device of claim 20, further comprising instructions that, when executed by the one or more processors, cause the one or more processors to display at least one alert while the computing device is locked, wherein the at least one alert is displayed concurrently with the user interface object, and wherein the at least one alert includes a notification of at least one event.

25. A non-transitory computer-readable medium storing instructions that, when executed by one or more processors, cause the one or more processors to perform steps comprising:
   determining that the electronic device is locked;
   displaying a user interface object at an origin position on a display screen of a computing device;
   displaying a threshold boundary on the display screen in response to user interaction with the display screen, the displayed threshold boundary indicating a boundary that the user interface object is to move beyond for the electronic device to unlock;
   receiving a user input indicating movement of the user interface object;
   moving the user interface object in response to the user input; and
   in response to the user interface object being moved beyond the displayed threshold boundary, unlocking the computing device.

26. The computer-readable medium of claim 25, wherein the user interface object can be moved in substantially any direction on the display screen.

27. The computer-readable medium of claim 25, wherein the displayed threshold boundary is reachable from the origin position by movement of the user interface object in any of a plurality of directions.

28. The computer-readable medium of claim 25, further comprising instructions for displaying at least one alert while the computing device is locked, wherein the at least one alert is displayed concurrently with the user interface object, and wherein the at least one alert includes a notification of at least one event.

* * * * *